United States Patent [19]
Lee et al.

[11] Patent Number: 5,933,519
[45] Date of Patent: Aug. 3, 1999

[54] CYTOLOGICAL SLIDE SCORING APPARATUS

[75] Inventors: Shih-Jong J. Lee, Bellevue; Paul S. Wilhelm, Kirkland; Michael G. Meyer; Wendy R. Bannister, both of Seattle; Chih-Chau L. Kuan, Redmond; William E. Ortyn, Devall; Larry A. Nelson, Bellevue; Keith L. Frost, Seattle; Jon W. Hayenga, Kent, all of Wash.

[73] Assignee: Neo Path, Inc., Redmond, Wash.

[21] Appl. No.: 08/867,017

[22] Filed: Jun. 3, 1997

Related U.S. Application Data

[63] Continuation of application No. 08/309,931, Sep. 20, 1994, abandoned.

[51] Int. Cl.$^6$ .............................. G06K 9/00; G06K 9/68; G06K 9/70
[52] U.S. Cl. .......................................... 382/133; 382/227
[58] Field of Search ................................. 382/100, 128, 382/129, 130, 131, 132, 133, 134, 181, 224, 226, 321, 325, 270, 145, 147, 227; 128/922; 356/39, 40; 377/10, 11

[56] References Cited

U.S. PATENT DOCUMENTS

| | | | |
|---|---|---|---|
| 3,824,393 | 7/1974 | Brain | 359/39 |
| 4,034,342 | 7/1977 | Kruklitis | 340/146.3 |
| 4,175,860 | 11/1979 | Bacus | 356/39 |
| 4,741,043 | 4/1988 | Bacus | 382/6 |
| 4,964,725 | 10/1990 | Rutenberg | 364/413.1 |
| 5,018,209 | 5/1991 | Bacus | 382/6 |
| 5,029,226 | 7/1991 | Klein et al. | 382/50 |
| 5,072,382 | 12/1991 | Kamentsky | 364/413.08 |
| 5,121,320 | 6/1992 | Aoki et al. | 364/413.01 |
| 5,202,931 | 4/1993 | Bacus | 382/6 |
| 5,235,522 | 8/1993 | Bacus | 364/497 |
| 5,257,182 | 10/1993 | Luck et al. | 364/413.1 |
| 5,281,517 | 1/1994 | Bacus et al. | 435/6 |
| 5,287,272 | 2/1994 | Rutenberg et al. | 364/413.01 |
| 5,315,700 | 5/1994 | Johnston et al. | 395/163 |
| 5,361,140 | 11/1994 | Hayenga et al. | 358/446 |
| 5,594,808 | 1/1997 | Shen et al. | 382/133 |
| 5,703,959 | 12/1997 | Asano et al. | 382/133 |

OTHER PUBLICATIONS

Bacus, James W. and Les J. Grace, "Optical Microscope System for Standardized Cell Measurements and Analyses", *Applied Optics*, 26:16, pp. 3280–3293, Aug. 15, 1987.

Bartels, Peter H. et al., "A Self–Learning Computer Program for Cell Recognition", *ACTA Cytologica: The Journal of Clinical Cytology*, 14:8, pp. 486–494, Oct. 1970.

Tanaka, Noboru et al., "Automated Cytologic Screening System (CYBEST Model 4): an Integrated Image Cytometry System", *Applied Optics*, vol. 26, No. 16, pp. 3301–3307, Aug. 15, 1987. Copyright© 1987 by the Optical Society of America and reprinted by permission of the copyright owner.

(List continued on next page.)

*Primary Examiner*—Bipin Shalwala
*Attorney, Agent, or Firm*—George A. Leone; Emil Moffa; Hans Sun

[57] ABSTRACT

The invention detects areas of interest at low magnification, locating possible abnormal cells or other cells of interest using image processing and statistical pattern recognition techniques. Next, at high magnification, the areas identified at low magnification are re-examined. The information from the low magnification and high magnification scans is collated and a determination is made about the slide—whether it is normal, abnormal, contains endocervical component, and so forth. The invention also provides a method and apparatus to train object feature and slide feature classifiers. The invention provides an automated cytology system that can process training slides for use in a feed back classifier development environment. The invention also can classify endocervical groups of cells.

24 Claims, 16 Drawing Sheets

OTHER PUBLICATIONS

Duda, Richard O. and Peter E. Hart, "Fisher's Linear Discriminant", *Patent Classification and Scene Analysis*, Copyright ©1973, pp. 114–119.

Dytch, Harvey E. et al., "An Interactive Microcomputer–Based System for the Quantitative Analysis of Stratified Tissue Sections", *Analytical and Quantitative Cytology and Histology*, vol. 9, No. 1, pp. 69–78, Mar. 1987.

Enslein, Kurt and Peter W. Neurath, "Augmented Stepwise Discriminant Analysis Applied to Two Classification Problems in the Biomedical Field", *Computers and Biomedical Research*, 2, 568–581 (1969).

Kurman, Robert J. et al., "Part 1: Specimin Adequacy" and "Part 2: Descriptive Diagnoses", *The Bethesda System for Reporting Cervical/Vaginal Cytologic Diagnoses*, Springer–Verlag.

Weber, J.E. et al., "Fuzzy Reasoning, Possibility Theory and Probability Theory in Expert Systems for Histopathology", IEEE/Ninth Annual Conference of the Engineering in Medicine and Biology Society, pp. 1560–1562, ©1987.

Wied, G.L. et al., "Expert Systems as Classifiers in Diagnostic Cytopathology", IEEE/Ninth Annual Conference of the Engineering in Medicine and Biology Society, pp. 1915–1917, ©1987.

Wied, G.L. et al., "Expert System Design Under Uncertainty of Human Diagnosticians", IEEE/Eighth Annual Conference of the Engineering in Medicine and Biology Society, pp. 757–760, ©1986.

Wied, G.L. et al., "Ticas–Stratex, an Expert Diagnostic System For Stratified Cervical Epithelium", IEEE/Ninth Annual Conference of the Engineering in Medicine and Biology Society, pp. 1557–1559, ©1987.

Serra, J., *Image Analysis and Mathematical Morphology*, pp. 372–423, Academic Press, 1982.

Smith, "Image Evaluation", *Modern Optical Engineering*, McGraw–Hill Book Company, 1966, pp. 308–323.

Patten, Jr., Stanley, "Diagnostic Cytopathology of the Uterine Cervix", Basel, Switzerland, Publisher: S. Karger, 1969, 2nd Edition 1978, Third vol. in *Monographs in Clinical Cytology*, edited by G.L. Wied, pp. 10–15.

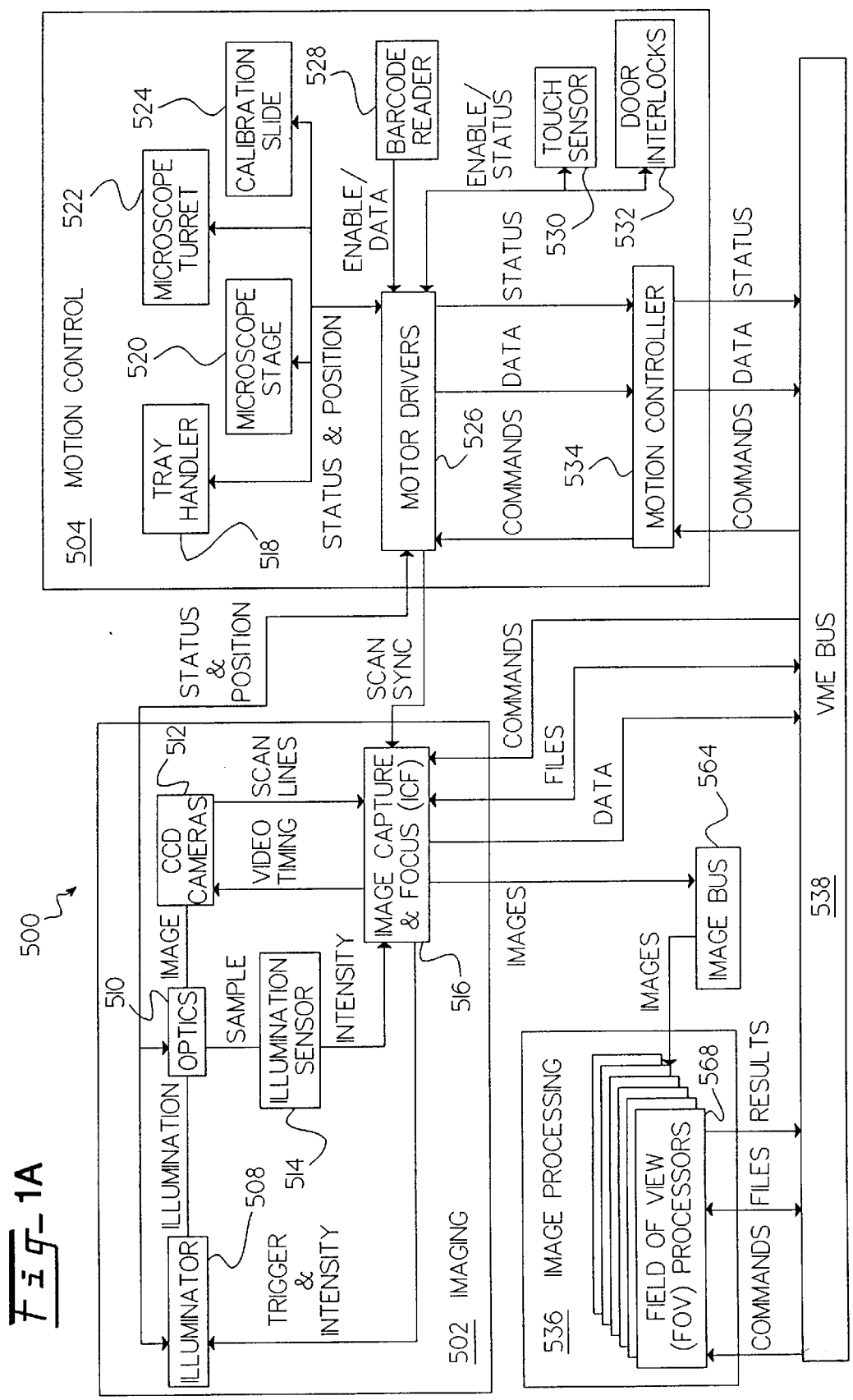

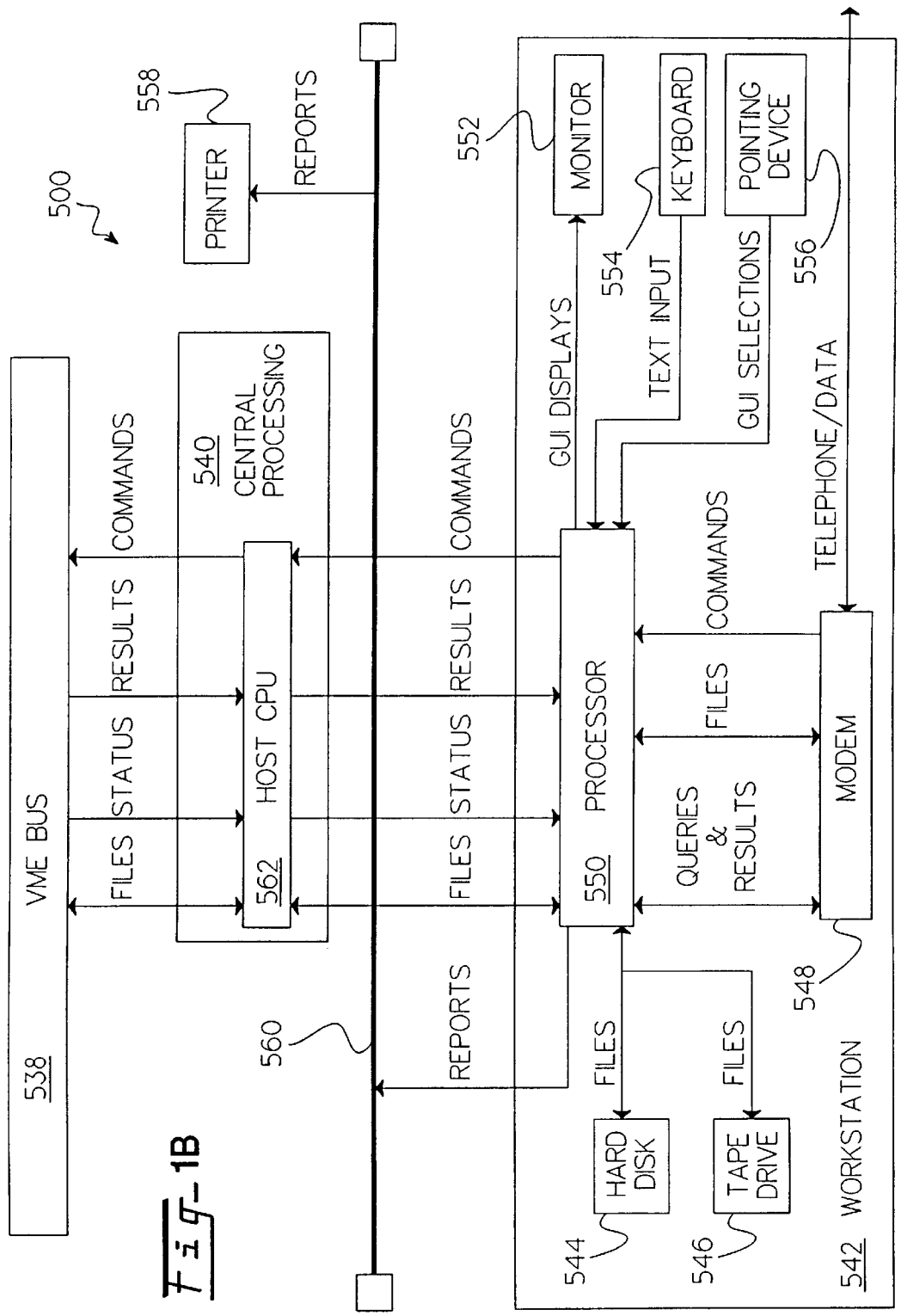

CYTOLOGICAL SLIDE SCORING APPARATUS

This application is a continuation of application Ser. No. 08/309,931, filed on Sep. 20, 1994 entitled CYTOLOGICAL SLIDE SCORING APPARATUS, pending in the United States Patent and Trademark Office now abandoned.

The invention relates to an automated cytology system and more particularly to an automated Papanicolaou-stained gynecological smear analysis system.

BACKGROUND OF THE INVENTION

The currently the well established human review process for Papanicolaou smear analysis follows standards recommended by the Bethesda System. A trained cytotechnologist systematically views a slide at low magnification to identify areas of interest. When an area of interest is identified, the cytotechnologist views the area at high magnification where it is possible to distinguish abnormal cells according to changes in their structure and context.

In much the same way as a human reviews Papanicolaou smears, it is one motivation of the invention to scan slides at low magnification to detect possible areas of interest, then at high magnification, to scan those areas to locate possible abnormal cells or other cells of interest. As a cytotechnologist compares size, shape and density of cells against established criteria, it is an additional motive of the invention to compare objects according to criteria established during a training process.

SUMMARY OF THE INVENTION

The invention detects areas of interest at low magnification, locating possible abnormal cells or other cells of interest using image processing and statistical pattern recognition techniques. Next, at high magnification, the areas identified at low magnification are re-examined. The information from the low magnification and high magnification scans is collated and a determination is made about the slide—whether it is normal, abnormal, contains endocervical component, and so forth. The invention also provides a method and apparatus to train object feature and slide feature classifiers. The invention provides an automated cytology system that can process training slides for use in a feed back classifier development environment. The invention also can classify endocervical groups of cells.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A, 1B and 1C show the apparatus of the invention.

DETAILED DESCRIPTION OF THE PREFERRED EMBODIMENT

Figure 1C:
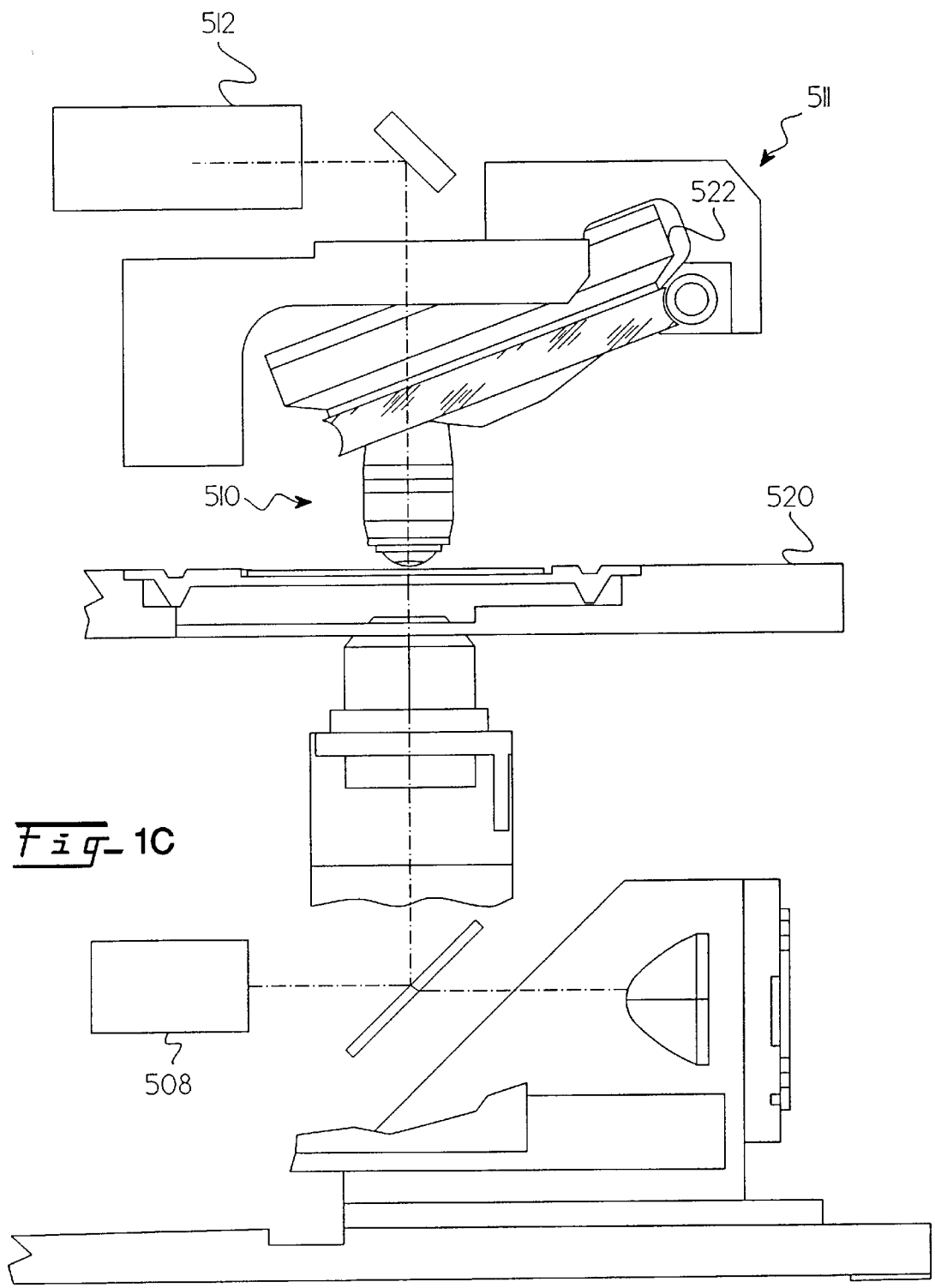

In a presently preferred embodiment of the invention, the system disclosed herein is used in a system for analyzing cervical pap smears, such as that shown and disclosed in pending U.S. application Ser. No. 08/571,686, filed Dec. 13 1995, which is a file wrapper continuation of abandoned U.S. patent application Ser. No. 07/838,064, entitled "METHOD FOR IDENTIFYING NORMAL BIOMEDICAL SPECIMENS", to Nelson et al., filed Feb. 18, 1992; U.S. Pat. No. 5,528,703, which is a continuation in part of abandoned U.S. patent application Ser. No. 07/838,395, entitled "METHOD FOR IDENTIFYING OBJECTS USING DATA PROCESSING TECHNIQUES", to Lee, filed Feb. 18, 1992; U.S. patent application Ser. No. 07/838,070, now U.S. Pat. No. 5,315,700, entitled "METHOD AND APPARATUS FOR RAPIDLY PROCESSING DATA SEQUENCES", by Richard S. Johnston et al., filed Feb. 18, 1992; U.S. patent application Ser. No. 07/838,065, filed Feb. 18 1992, now U.S. Pat. No. 5,361,140 entitled "METHOD AND APPARATUS FOR DYNAMIC CORRECTION OF MICROSCOPIC IMAGE SIGNALS" by Jon W. Hayenga et al.; and allowed U.S. patent application Ser. No. 08/302,355, filed Sep. 7, 1994 entitled "METHOD AND APPARATUS FOR RAPID CAPTURE OF FOCUSED MICROSCOPIC IMAGES" to Hayenga et al., which is a continuation in part of abandoned application Ser. No. 07/838,063 filed on Feb. 18, 1992, the disclosures of which are incorporated herein, in their entirety, by the foregoing references thereto.

The present invention is also related to biological and cytological systems as described in the following patent applications which are assigned to the same assignee as the present invention, filed on even date herewith, and which are all hereby incorporated by reference including pending U.S. application Ser. No. 08/309,405, to Frost et al., entitled "AUTOMATIC FOCUSING OF BIOMEDICAL SPECI- MENS APPARATUS," pending U.S. application Ser. No. 08/650,048, filed May 16 1996, which is a file wrapper continuation of abandoned U.S. application Ser. No. 08/309,064, to Ortyn et al., entitled "APPARATUS FOR ILLUMINATION STABILIZATION AND HOMOGENIZATION," pending U.S. application Ser. No. 08/697,480, filed Aug. 26, 1996, which is a file wrapper continuation of abandoned U.S. application Ser. No. 08/309,249, to Ortyn et al., entitled "BIOLOGICAL SPECIMEN ANALYSIS SYSTEM PROCESSING INTEGRITY CHECKING APPARATUS," pending U.S. application Ser. No. 08/303,179, to Ortyn et al., entitled "CYTOLOGICAL SYSTEM ILLUMINATION INTEGRITY CHECKING APPARATUS AND METHOD," allowed U.S. application Ser. No. 08/309,078, to Ortyn et al., entitled "CYTOLOGICAL SYSTEM IMAGE COLLECTION INTEGRITY CHECKING APPARATUS," U.S. application Ser. No. 08/309,130, now U.S. Pat. No. 5,557,097, to Ortyn et al., entitled "CYTOLOGICAL SYSTEM AUTOFOCUS INTEGRITY CHECKING APPARATUS," U.S. application Ser. No. 08/308,140, now U.S. Pat. No. 5,499,097, to Ortyn et al., entitled "METHOD AND APPARATUS FOR CHECKING AUTOMATED OPTICAL SYSTEM PERFORMANCE REPEATABILITY," pending U.S. application Ser. No. 08/309,118, to Kuan et al. entitled, "FIELD PRIORITIZATION APPARATUS AND METHOD," pending U.S. application Ser. No. 08/309,061, to Wilhelm et al., entitled "APPARATUS FOR AUTOMATED IDENTIFICATION OF CELL GROUPINGS ON A BIOLOGICAL SPECIMEN," pending U.S. application Ser. No. 08/309,116, to Meyer et al. entitled "APPARATUS FOR AUTOMATED IDENTIFICATION OF THICK CELL GROUPINGS ON A BIOLOGICAL SPECIMEN," pending U.S. application Ser. No. 08/667,292, filed Jun. 20 1996, which is a file wrapper continuation of abandoned U.S. application Ser. No. 08/309,115, to Lee et al. entitled "BIOLOGICAL ANALYSIS SYSTEM SELF CALIBRATION APPARATUS," pending U.S. application Ser. No. 08/678,124, filed Jul. 11 1996, which is a file wrapper continuation of abandoned U.S. application Ser. No. 08/308,992, to Lee et al. entitled "APPARATUS FOR IDENTIFICATION AND INTEGRATION OF MULTIPLE CELL PATTERNS," pending U.S. application Ser. No. 08/309,063, to Lee et al. entitled "METHOD FOR CYTOLOGICAL SYSTEM DYNAMIC NORMALIZATION," allowed U.S. application Ser. No. 08/309,248, to Rosenlof et al. entitled "METHOD AND APPARATUS FOR DETECTING A MICROSCOPE SLIDE COVERSLIP," U.S. application Ser. No. 08/309,077, now U.S. Pat. No. 5,566,249, to Rosenlof et al. entitled "APPARATUS FOR DETECTING BUBBLES IN COVERSLIP ADHESIVE," pending U.S. application Ser. No. 08/309,148, to Lee et al. entitled "METHOD AND APPARATUS FOR IMAGE PLANE MODULATION PATTERN RECOGNITION", pending U.S. application Ser. No. 08/309,250, to Lee et al. entitled "APPARATUS FOR THE IDENTIFICATION OF FREE-LYING CELLS," pending U.S. application Ser. No. 08/309,209, to Oh et al. entitled "A METHOD AND APPARATUS FOR ROBUST BIOLOGICAL SPECIMEN CLASSIFICATION," pending U.S. application Ser. No. 08/309,117, to Wilhelm et al., entitled "METHOD AND APPARATUS FOR DETECTION OF UNSUITABLE CONDITIONS FOR AUTOMATED CYTOLOGY SCORING."

It is to be understood that the various processes described herein may be implemented in software suitable for running on a digital processor. The software may be embedded, for example, in the central processor 540.

The invention utilizes a set of image analysis and decision making apparatuses. Their purpose is to provide information for the control of slide processing and to provide a cytologic evaluation for each slide analyzed.

Now refer to FIGS. 1A, 1B and 1C which show a schematic diagram of one embodiment of the apparatus of the invention. The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. In one embodiment the central processor 562 comprises a Motorola 68030 CPU. The motion controller 504 is comprised of a tray handler 518, a microscope stage controller 520, a microscope tray controller 522, and a calibration slide 524. The motor drivers 526 position the slide under the optics. A bar code reader 528 reads a barcode located on the slide 524. A touch sensor 530 determines whether a slide is under the microscope objectives, and a door interlock 532 prevents operation in case the doors are open. Motion controller 534 controls the motor drivers 526 in response to the central processor 540. An Ethernet communication system 560 communicates to a workstation 542 to provide control of the system. A hard disk 544 is controlled by workstation 550. In one embodiment, workstation 550 may comprise a Sun Spark Classic (TM) workstation. A tape drive 546 is connected to the workstation 550 as well as a modem 548, a monitor 552, a keyboard 554, and a mouse pointing device 556. A printer 558 is connected to the Ethernet 560.

The central computer 540 runs a real time operating system, controls the microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

Initially the computer 540 implements a magnification 4× analysis of the slide providing information for the control of further slide processing. The 4× analysis extracts cellular information from low magnification (4×) images. The 4× image is divided into a number of 20× images. Those skilled in the art will recognize that the low resolution and high resolution magnifications may differ without deviating from the scope of the invention. For each 20× region of a 4× image, scores are generated representing the likelihood that the 20× region (also known as 20× field of view or 20× FOV contains abnormal cells or cellular groupings. After scores have been generated for each 20× FOV on the slide during the 4× scan, a 20× FOV selection analysis uses the scores to prioritize the 20× scan.

It is to be understood that the various processes described herein may be implemented in software suitable for running on a digital processor. The software may be embedded, for example, in the central processor 540.

At high magnification, several different analyses are used to extract information from images; several are used because abnormality may be present in different forms. Additionally, cellular abnormality is not the only condition that the invention identifies as needing review. If the cell sample was collected inadequately, or preserved or stained improperly, the slide may contain obscured, degenerate, or incomplete cellular material. In one embodiment of the invention, laboratory personnel review such slides as well as those where abnormality has been identified. The following analyses are performed to extract information from the 20× magnification images: single cell analysis, group analysis, thick group analysis, and stripe analysis.

Slide scores are calculated from data gathered during the 4× and 20× scans. The computer 540 generates scores after slide scoring analysis such as quality control score (QC score), endocervical score, slide suitability score, and cell count score.

The computer 540 performs two basic operations: information extraction and information analysis. Examples of information extraction operations are the 4× magnification analysis and 20× magnification analysis, which analyze images. Examples of information analysis operations are the slide scoring analysis and the 20× FOV selection analysis, which make decisions based on extracted data.

The information extraction operation examines images and calculate measures of image content. Generally, information about objects in each image are of the greatest interest.

Figure 2A:
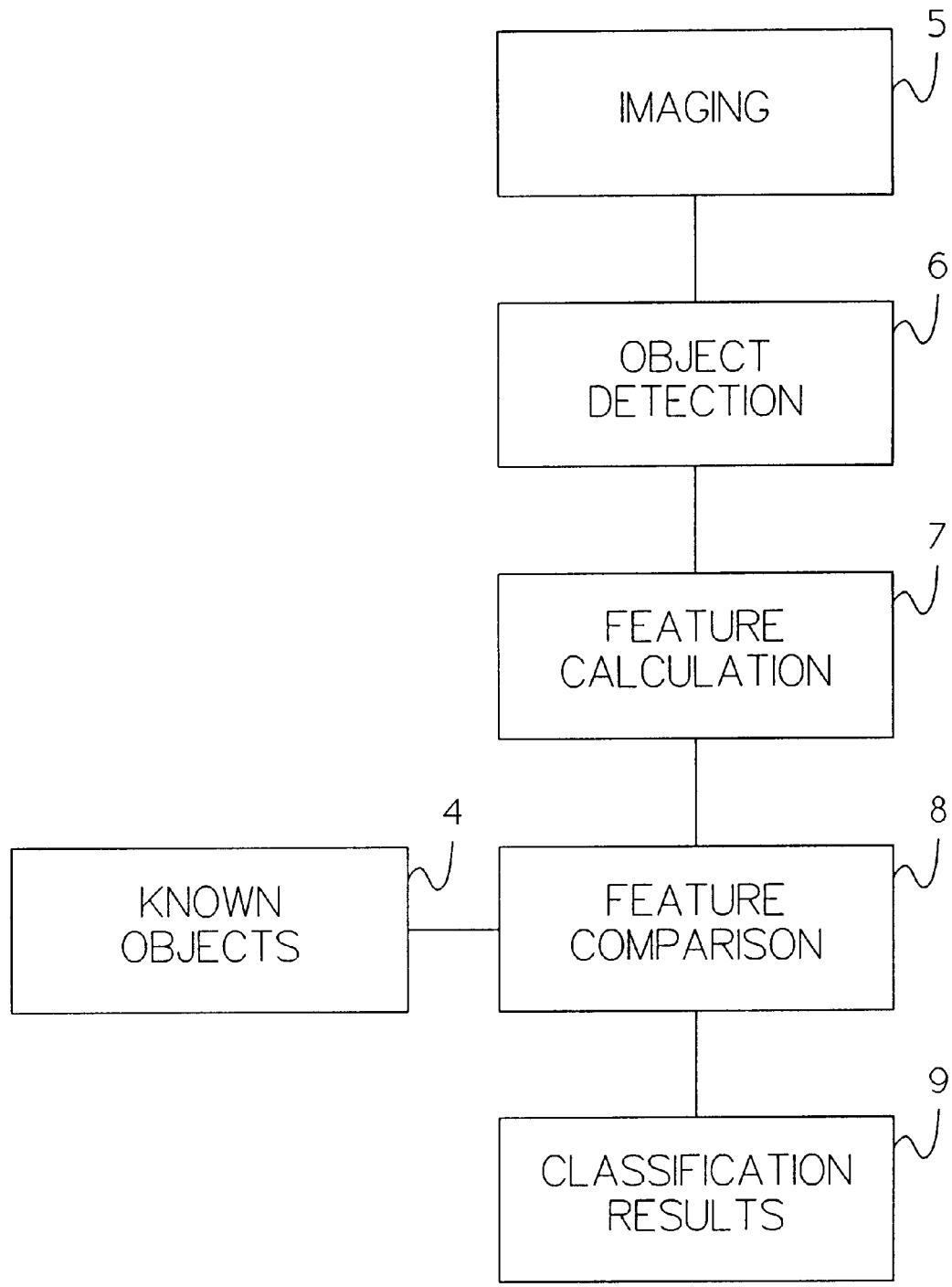
FIG. 2A shows the classification method of the invention.

The process of detecting objects and calculating measures or features of the objects is shown in FIG. 2A. The object detection process 6 detects objects through image segmentation. These objects represent potential objects of interest; for example, an abnormal cell nucleus.

The feature calculation process 7 measures properties such as perimeter or area for each detected object. After feature calculation 7, the invention compares 8 the feature value for an unknown object to the feature values for known objects 4, allowing the unknown object to be classified 9. The particular feature representation and classification methods determine the comparison criterion.

The information analysis process takes information gathered from various sources and produces specific results. For example, the slide scoring process takes information from the information extraction operation and calculates scores that represent cytologic evaluations of a slide.

Computer 540 controls slide analysis by commanding a number of specialized supporting processors 568. Image information extraction is handled by FOV processors. Each FOV processor 568 has an image queue, so computer 540 can sequence images to each FOV processor while information extraction continues on images previously placed in the queue. Once an FOV processor 568 has completed the analysis of an image, it passes information about the image to computer 540 where the information is stored for later analysis and slide scoring.

Because each FOV processor 568 has access only to information from one image at a time, and because computer 540 has access to information from the entire slide, the host processor must complete classification for detected objects that require multi-image features. As a result, all object detection is done on the FOV processors 568, but not all feature calculation and object classification is done on the FOV processors 568. Some intermediate results must be passed from the FOV processor 568 to computer 540 for later completion of feature calculation and object classification. FIG. 2A shows the generic flow diagram for image information extraction.

Feature calculation 7 and object classification 8 may happen on the FOV processor 568 or on both the FOV processor 568 and the host processor 540. If multi-image features are not required for object classification 8, feature calculation 7 and object classification will not occur on the host processor 540. If multi-image features are required, then feature calculation and object classification will occur on both the FOV processor 568 and the computer 540. Those skilled in the art will recognize that when multi-scan images are analyzed processing of all images cannot be completed until the information needed to calculate multi-image features is available.

Figure 2B:
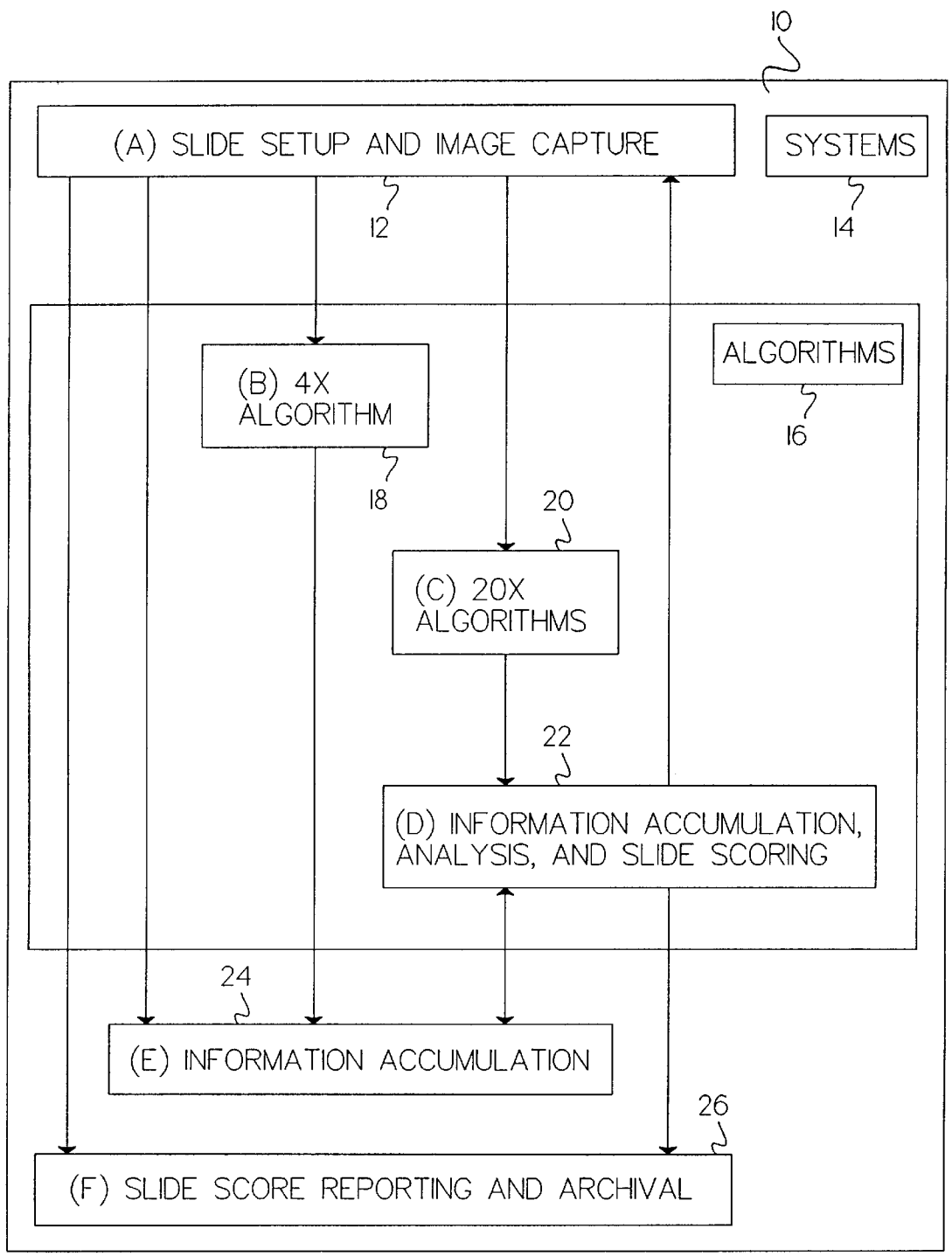
FIG. 2B shows an information flow diagram of the method of the invention.

FIG. 2B shows the invention's slide handling software organized as system software 14 and analysis software 16. The diagram represents logical associations between subsystems within analysis software and system software. Note that system software has been broken into three subsystems:

Slide Setup and Image Capture 12, primarily provides images to the analysis software.

Information Accumulation 22, which accumulates slide data during processing.

Slide Score Reporting and Archival 26, which organizes and reports slide results to the user.

Arrows in the FIG. 2B represent information flow, including image data, object features, and analysis results. The invention provides a slide suitability score for biological specimen slides. The slide suitability score is one of six slide scores that are the results of processing slides on the automated cytology quality control system of the invention.

The slide suitability score is derived from measurements of slide characteristics and machine effectiveness. Slide characteristics are properties of the sample and slide, such as bubble area, cover slip and mounting medium thickness, and staining properties. Machine effectiveness measures such as the percentage of requested fields of view that were focused adequately or the percentage of acquired images that had saturated pixels are measures of how well the invention is setup on and has processed a slide. For a particular slide, the slide suitability score determines the reliability of the other slide scores, and thus, whether those scores should be reported. If a particular slide is anomalous, or if the invention did not operate effectively on the slide, the slide suitability score flags the unacceptable machine condition or slide characteristic so that potentially false results are not used to evaluate the biological specimen slide.

The suitability score's primary design goal is to identify the conditions under which the AutoPap® 300 QC had performance limitations during training. The performance requirement of the suitability score for a laboratory for whose processes are within design operation conditions of the automated analysis apparatus is to score no more than 5% of the slides as being unsuitable.

Additionally, the suitability score identifies conditions that were not encountered during training. For example, if during training, the stain measures for all slides ranged between 3 and 4, any slide that now measures 2 is outside that range, and as a result, unsuitable. Thus, the range of training data was used to set boundaries for future suitability scoring. Finally, the suitability score identifies slides on which algorithm processing errors were encountered.

After the entire slide has been processed, the slide suitability score is determined using features provided by the slide scoring software. The suitability score is archived with other slide scores.

The output is an enumeration indicating whether a slide passed or failed the slide suitability tests, and in the case of failure, identifying which test foiled.

During the 4× magnification scan the analysis process receives images from the computer 540 FOV boards 568 and sends image information extraction results back to the computer 540 for accumulation.

When the 4× scan is completed, the accumulated extracted results are analyzed using the 4×' algorithm 18 and the analysis results 24 are passed back to the computer 540. Computer 540 uses the 4× scan analysis results for 20× scanning prioritization and accumulates the 4× scan analysis results for later slide scoring.

Once the 20× scan has been completed, accumulated extracted information is used to perform slide scoring. Slide score is reported and archived.

Figure 3:
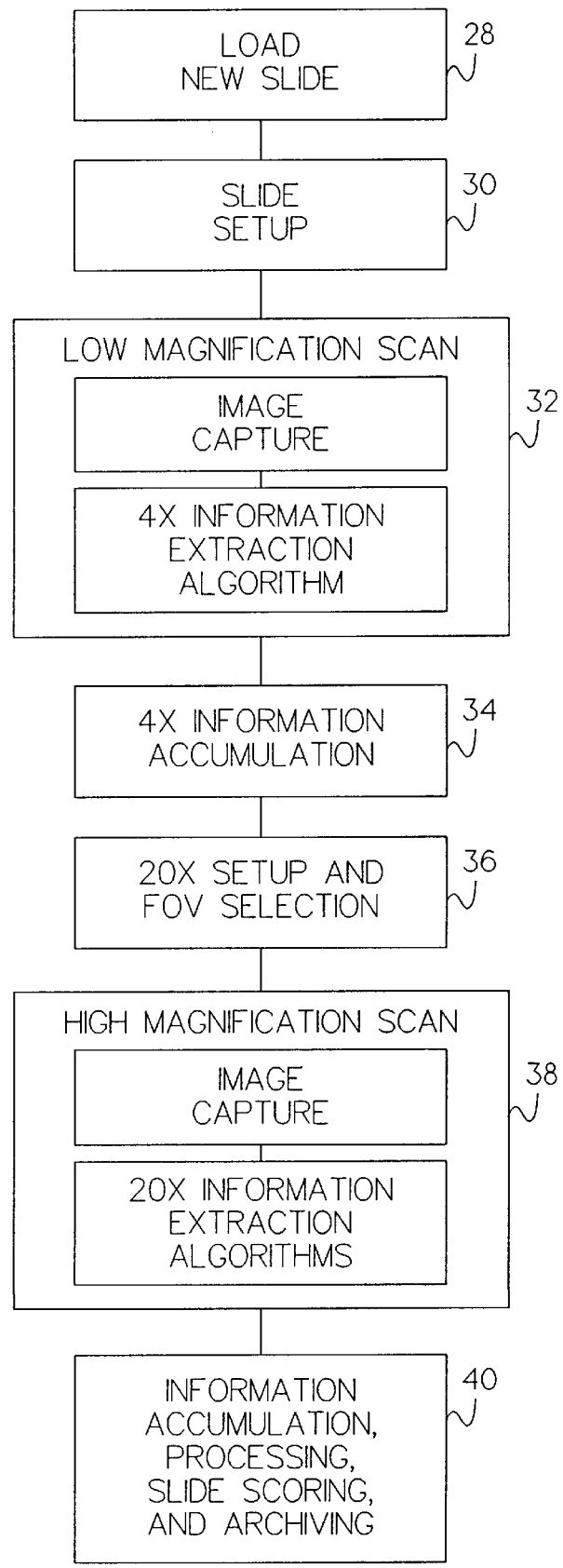
FIG. 3 shows the slide processing method of the invention.

FIG. 3 is a slide processing flow chart of the method of the invention to process biological specimen slides. It shows the order in which each analysis sub-system is executed during slide processing. Because processing is distributed in the invention, the low magnification scan 32 and the high magnification scan 38 do not represent a strict sequential process. Those skilled in the art will recognize that the various computers of the invention may execute them in a parallel or serial fashion. During each scan, a number of images are captured and processed, and information about them is accumulated for later use. New slides are loaded under the microscope at step 28 and set up at step 30. During the 4× analysis process 32 the computer 540 extracts information from images during the 4× scan of each slide. The information extracted from each image is used primarily to prioritize image acquisition for the 20× scan 38. Additionally, the information is used for slide scoring 40.

The 4× magnification information is used to avoid scanning at high magnification in the following areas of the slide:

Blank areas

Areas contained within bubbles

The edges of the coverslip

Areas containing cells that are inadequate for analysis at high magnification (for example, thick sheets of cells).

Stripe areas, stripes are periodic illumination caused variations appearing on the slide.

The information 34 acquired during the 4× magnification scan is reported as two priority rankings for each 20× FOV: (1) the likelihood that the FOV contains isolated abnormal cells (SIL rankings) and (2) the likelihood that the FOV contains analyzable cellular groups (Group ranking). Additionally, the 4× analysis provides information about the bubble edge content of each 20× FOV (bubble edge flags). The 20× FOV selection analysis 36 uses this information to determine the scan/process sequencing for 20× image acquisition. The scan/process information is passed to system software responsible for acquisition of 20× images.

To provide information for slide scoring, the 4× analysis also derives three histograms—object count, cell count, and cell to object ratio histogram. These histograms provide measures of object populations on the entire slide.

Figure 4:
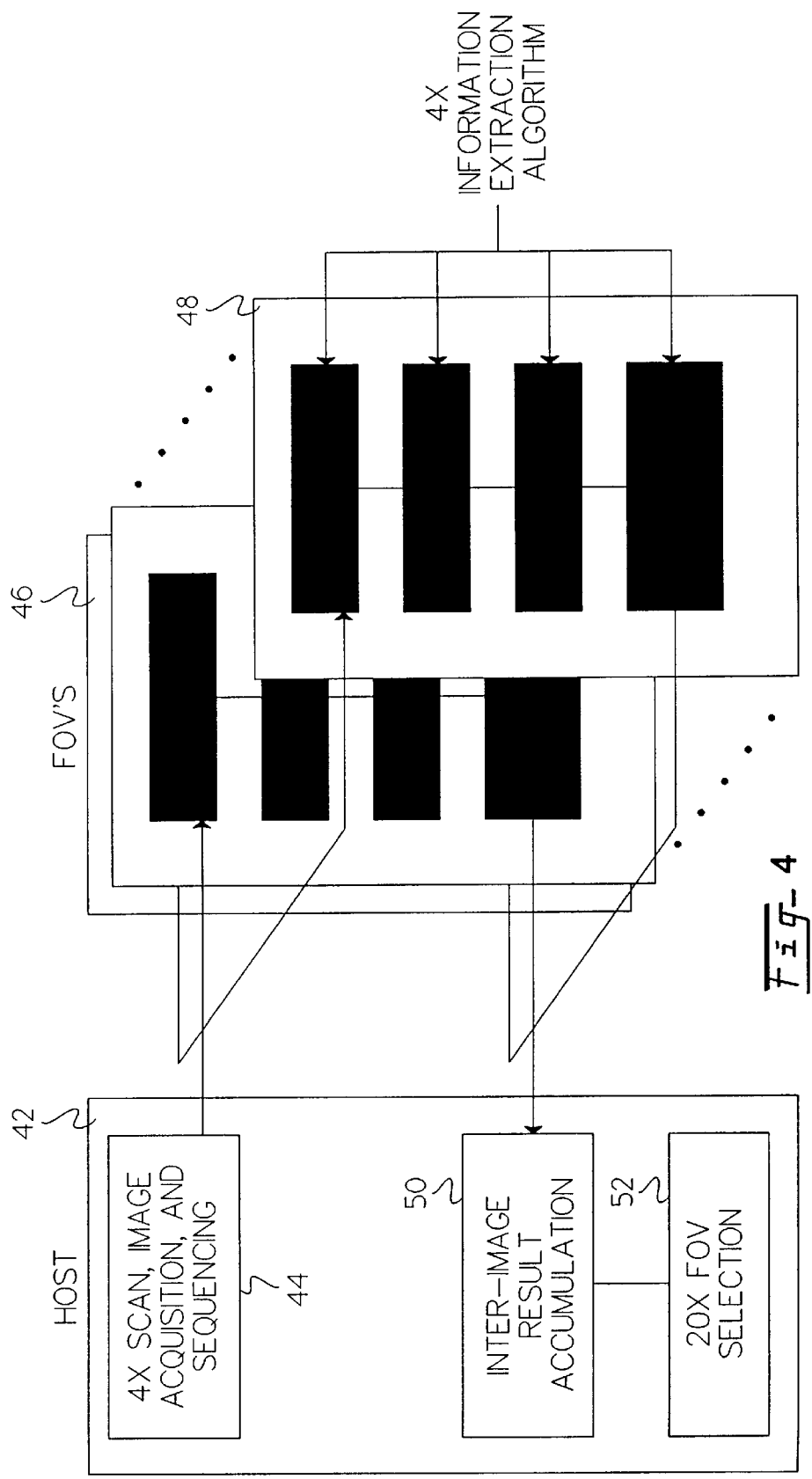
FIG. 4 shows the 4× magnification scan processing of the invention.

FIG. 4 shows the information flow during the 4× scan. The 4× scan is made up of slide scanning, image acquisition, and sequencing 44, 4× information extraction 46–48, result accumulation 50, and 20× FOV selection 52. The host processor 540 controls the 4× scanning and image acquisition. For each image acquired, the host processor 540 sequences the image to one of a number of FOV processors 568. The FOV processor 568 extracts information, and results are returned to the host processor 540 for accumulation, 20× FOV selection, and later slide scoring 62 shown in FIG. 5.

Figure 5:
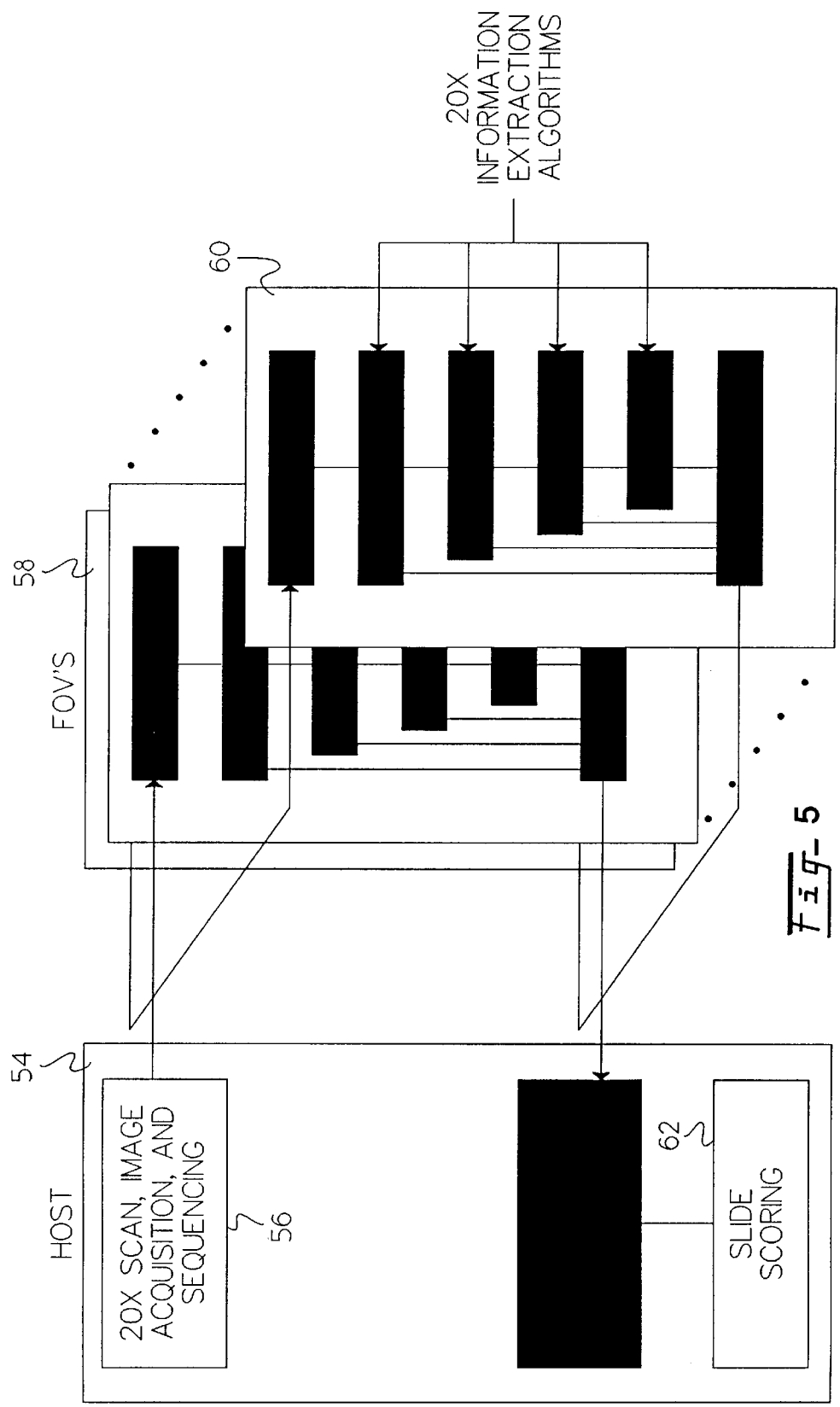
FIG. 5 shows the 20× magnification scan processing of the invention.

Still referring to FIG. 5, the 20× magnification analysis extracts information 58–60 from 20× scan images. The information extracted by these analysis provides information for slide scoring 62. The primary image extraction analysis is the single cell analysis. The two secondary image extraction analysis are the group analysis and the thick group analysis. A tertiary analysis is the stripe analysis. Information from each analysis is passed to the FOV integration process for collation and transfer to the host processor 540. The host processor accumulates multi-image results. When the 20× scan is completed, the host processor scores the slide.

The stripe analysis detects illumination anomalies caused by inappropriate obstructions in the illumination path, for example, dirt on the coverslip. When stripes are detected, the stripe analysis passes information about the stripes to the FOV integration analysis.

The single cell analysis detects single, non-overlapping nuclei and cytoplasm within 20× images. When such objects are detected, the analysis extracts features for each object and classifies the object as intermediate cell, normal, artifact, or potentially abnormal. The single cell analysis passes object classification, stain evaluation, object feature results, and error information to the FOV integration analysis.

The group analysis detects aggregates of cell nuclei within 20× images. When such objects have been detected, the analysis extracts features for each object and classifies the object as an artifact, possible endocervical, possible metaplastic/parabasal, or possible abnormal group. Since the single cell analysis is executed before the group analysis on each image, information from the single cell analysis is available to the group analysis for object classification. Object classification, object feature results, and error information are passed from the group analysis to the FOV integration analysis.

The thick group analysis detects 3-D aggregates of cell nuclei within 20× images. The difference between thick group and group detection is that the thick group analysis detects aggregates that are so thick that individual nuclei are difficult to distinguish. When thick groups are detected, the analysis extracts features for each object and classifies the object as abnormal or other. Both the single cell analysis and group analysis are executed before the thick group analysis and both can pass information to the thick group analysis for object classification. Object classification results and error information are passed from the thick group analysis to the FOV integration analysis.

The FOV integration analysis takes input from each of the other 20× analysis. All input is integrated, and the instances where different types of objects of interest occur in the same image are computed. For example, when potentially abnormal cells are detected by the single cell analysis, the integration analysis computes how many potentially abnormal cellular aggregates were identified by the group analysis in the same image. The resultant feature is the number of potentially abnormal groups when there were potentially abnormal single cells. All information about the FOV, including features for objects not completely classified (for use by the add-on classifiers), is collated and passed to the host processor 540.

The host processor can classify objects using features from more than one image. Once the required features are available, the host processor completes object classification for each object and adds the new information to the accumulated slide information. With this information, the slides can be scored.

Each slide is analyzed for abnormality (QC score analysis), composition (Endocervical score and Cell Count analysis), and suitability for machine processing (Suitability score analysis). These analysis are described in Table 1

TABLE 1

| Analysis | Description |
| --- | --- |
| QC Score | Using information extracted by the 20x analysis from the slide during 20x scan, a score is assigned to the slide that represents the slide's likelihood of containing abnormality. When the c score exceeds a set threshold, the slide should be sent back for human review. |
| Endocervical Score | Using information extracted by the single cell and group analysis from 20x images of the slide, the AutoPap 300 QC system assigns a score to the slide that represents the slide's likelihood of containing endocervical component. When the endocervical score exceeds a set threshold, the slide is considered to contain adequate endocervical component cells. |
| Cell Count Score | Using information extracted by the single cell analysis from 20x images of the slide, the AutoPap 300 QC system assigns a number that represents an estimate of the count of squamous cells on the slide. When this value is above a set threshold, the slide is considered to contain adequate squamous component for analysis. |
| Suitability Score | Using information extracted by the 4x analysis and the 20x analysis, an analysis determines whether the slide is suitable for machine processing. If the slide is determined to be unsuitable for scoring, the AutoPap 300 QC system provides a suitability score that represents the reason for unsuitability. When a slide is determined to be unsuitable for machine processing, the only slide score provided to the user will be the suitability score. (All scores are reported to system software regardless of the suitability of the slide. See the Error Handling section.) |

Figure 6:
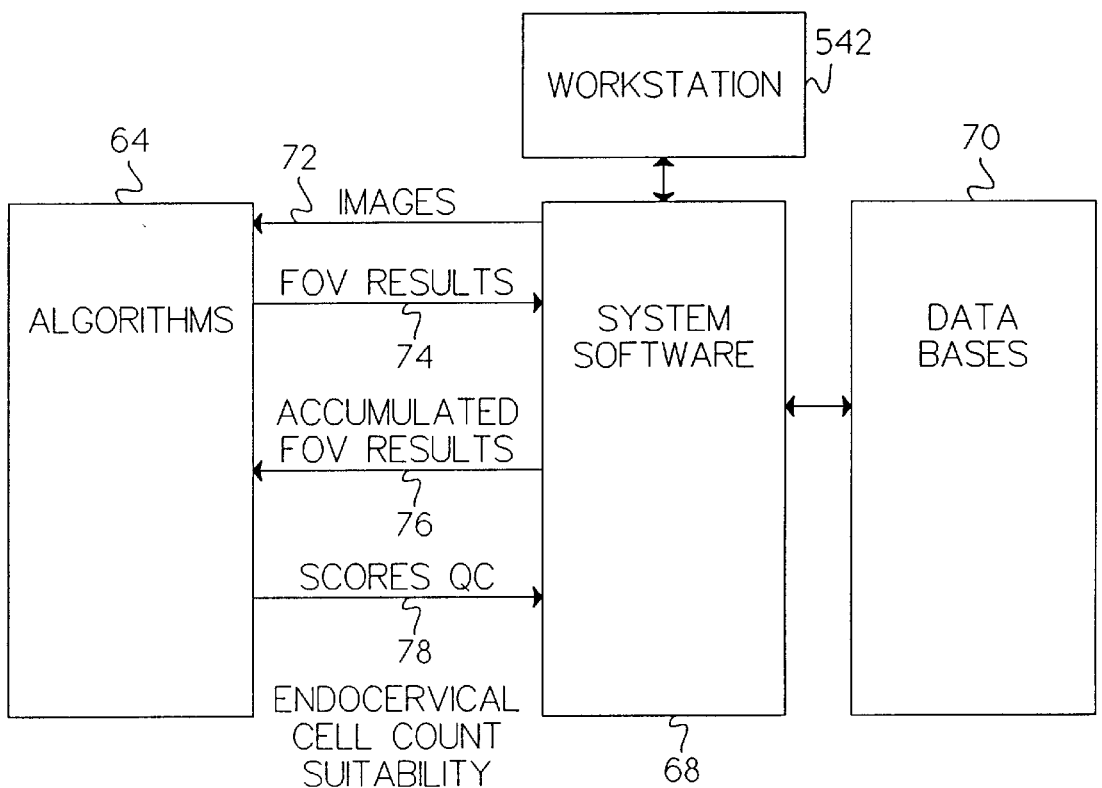
FIG. 6 shows the apparatus of the invention with system software interfacing.

Refer now to FIG. 6 which shows a system interface schematic diagram. The workstation 542 allows users to interact with the invention system. A database 70 of results from each slide run is maintained. The interfaces shown ensure that the following calculations and communications occur:

The system software 68 makes images available to the analysis on the FOVs.

The system algorithms 64 process each image and pass results 74 (which includes error conditions if necessary) for that FOV back to the system software 68.

The system software 68 accumulates FOV results 76 for an entire slide as processing continues.

The system software 68 provides the analysis with accumulated slide processing results, from which the analysis derive the following scores:

QC score 78

Endocervical score

Cell count score

Suitability score

The algorithms 64 pass the scores back to the system software 68.

TABLE 2

Algorithm Requirements Allocation

| | Algorithms | | | | | | | | |
|---|---|---|---|---|---|---|---|---|---|
| Requirements | QC Score | Endoc Score | Suitability Score | Cell Count | 4x Alg | Stripe Alg | Single Cell Alg | Group Alg | Thick Group Alg |
| Suitability for Machine Processing | | | X | | | | | | |
| Endocervical/ Transformation Zone Component | | X | | | | | | | |
| Squamous Epithelial Component | | | | X | | | | | |
| Throughput Rate | X | X | X | X | X | X | X | X | X |
| Specify (Sort Rate) | X | | | | | | | | |
| Cytological Sensitivity | X | | | | | | | | |

TABLE 3

Information Analysis and Supporting Algorithm Dependencies

| Information Analysis Algorithms | Supporting Algorithms | | | | | | |
|---|---|---|---|---|---|---|---|
| | 4x Alg. | 20x FOV Selection Alg. | Stripe Alg. | Single Cell Alg | Group Alg | Thick Group Alg | Add-on Classifier |
| QC Score | | X | | X | X | X | X |
| Endocervical Score | | X | | X | X | | |
| Suitability Score | X | | X | X | X | X | |
| Cell Count | | | | X | | | |
| Add-On Classifiers | | | | X | X | | N/A |
| 20x FOV Selection Alg | X | N/A | | | | | |

Each of the information analysis operations (QC score, endocervical score, suitability score, and cell count) is dependent upon supporting analysis. Table 3 shows these dependencies. The horizontal axis lists the supporting analysis. The vertical axis lists the information analysis. (Note that Add-on Classifiers and 20x FOV Selection analysis are included in this list because they require information from supporting analysis. The Add-on Classifiers and 20x FOV Selection analysis in turn provide information to the information analysis, so they appear in both the horizontal and vertical axes.) An x indicates that an information analysis is dependent upon a supporting analysis.

For example, the Specificity requirement is solely dependent upon the QC score analysis, so the specificity requirements must be met by QC score analysis. The QC score analysis, however, is dependent on five information extracting or supporting analysis, see Table 3.

Figure 7:
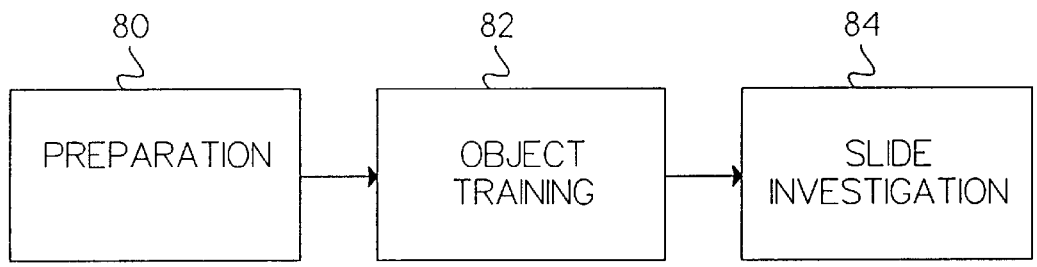
FIG. 7 shows a schematic diagram of the classifier development method of the invention.

Refer now to FIG. 7 which shows the apparatus of the invention during training. Computer training programs generate the classification processes of the apparatus of the invention using a representative set of examples. Each example comprises an object with a known diagnosis. Each object is represented by a set of discriminative features. An object can be a single cell, a group or a thick group of cells, or a slide.

The machine training process must deal with pap smear qualities that present major challenges. These qualities include large variations caused by system bias, random noise, staining, sampling, fixation, slides, cells, and so on. To cover all possible variations, machine training requires sufficient training cases. Also, it important to derive robust features, which are less sensitive to the variations, and to carefully validate the decision structures and selected features.

Abnormal slides may have over 100,000 normal cells and as few as 10 abnormal cells. Detecting these slides requires high sensitivity to abnormal cells, yet demands an extremely low false-positive rate for normal objects.

Machine training includes the three phases shown in FIG. 7, the preparation phase 80, object training phase 82 and slide investigation phase 84. The preparation phase 80 involves, development of the machine training strategy, development of training tools, and the development of features. The apparatus of the invention provides a tool to understand the clinical significance of slide and object features, develop the protocol for determining diagnostic truth, define object classification structures, identify clinically useful features for each cell classification decision, categorize training objects and determining sample sizes, characterize objects of interest by prevalence, and define performance goals.

Figure 8:
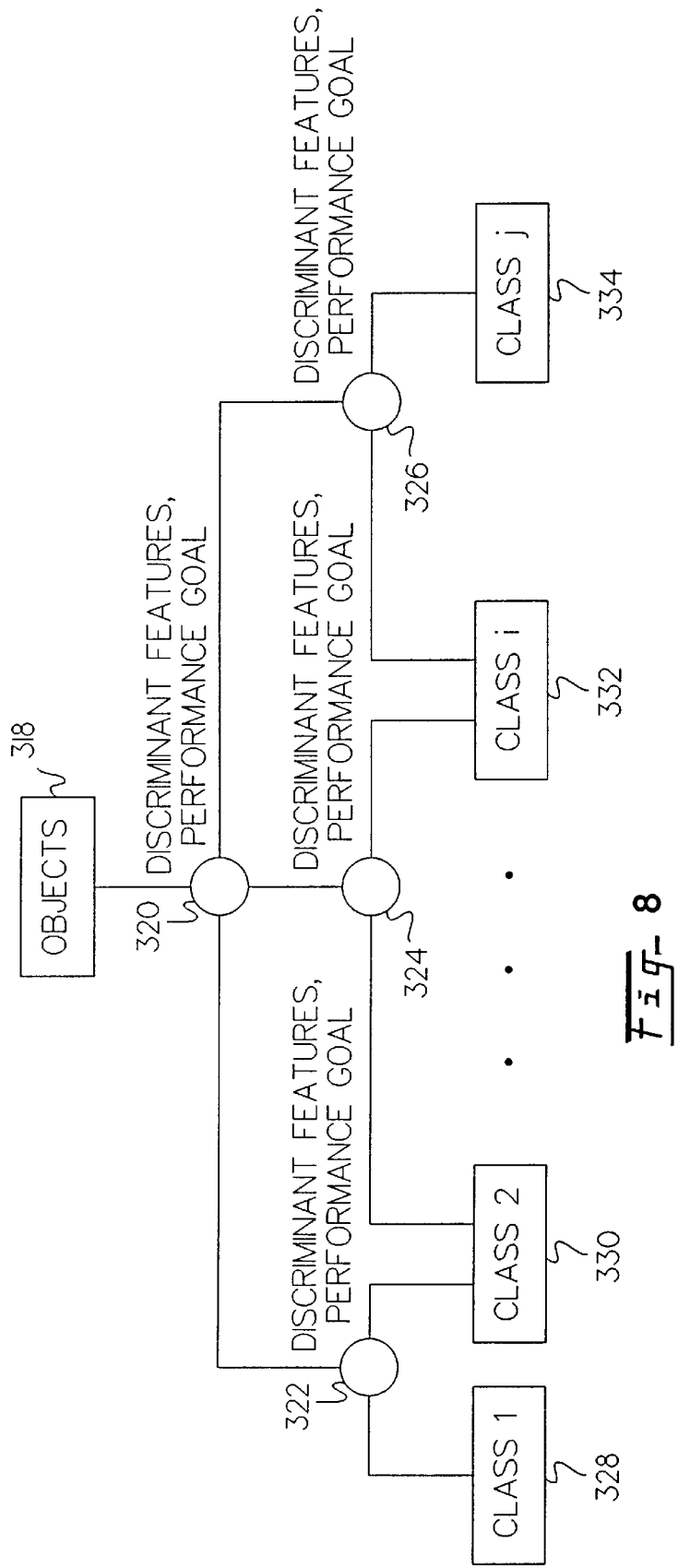
FIG. 8 shows one example of a classifier architecture of the method of the invention.

Refer now to FIG. 8 which shows a guide for classification architecture that specifies discriminant features, performance goals, and object categorization. FIG. 8 shows the components of a representative classification architecture for objects 318. Clinically meaningful, discriminant cell features and classification performance goals 320, 322, 324, 326 are used to define the classification architecture. The architecture is organized as a decision tree. The inputs and outputs, as well as discriminant features and performance goals, are specified for each node of the tree. Outputs for object classifications include classifications 328, 330, 332, and 334. Ideally, the classification architecture may be used as a basis for developing an object classification process.

The inputs to the preparation phase 80 are the results of an algorithm clinical knowledge integration stage. The objective of this stage is to clearly translate clinical knowledge and guidelines into detailed classifier designs and implementation plans. The tasks are to define or develop a machine architecture, a strategy for feature design, implementation, and testing, a strategy for algorithm evaluation and refinement, an image collection strategy, a strategy and protocol for database management, a work flow and protocol for data collection, and a quality assurance strategy for machine training and implementation.

Figure 9:
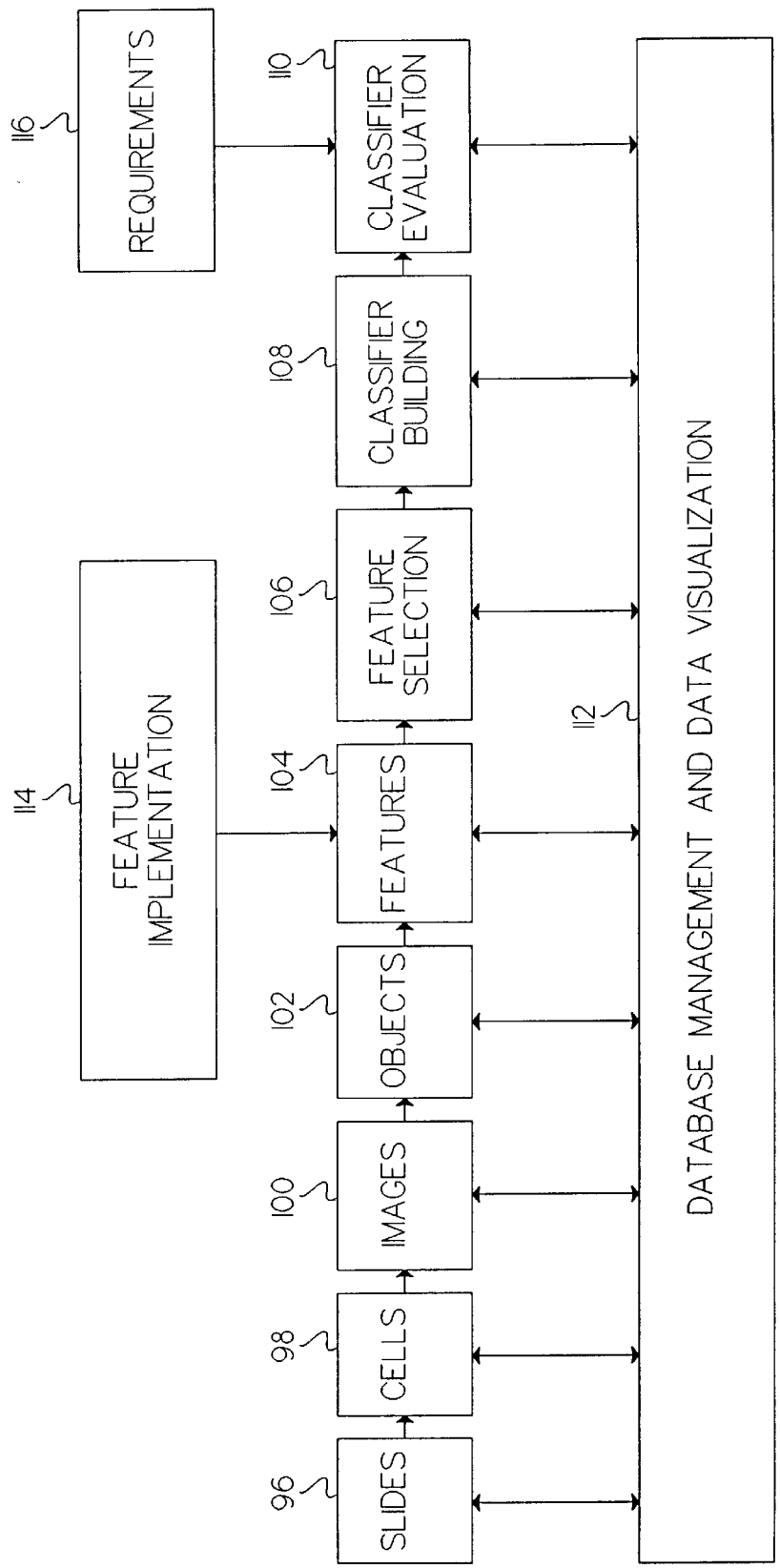
FIG. 9 shows a classifier training data flow diagram of the method of the invention.

Refer now to FIG. 9 which shows a data flow diagram of one embodiment of the processing steps in machine training. After the development of the machine architecture and training strategies, a data flow for machine training can be determined. To satisfy specify machine training requirements, features and tools are developed or modified.

Training slides 96 are acquired and cells of interest are identified 98. Then, images containing the cells of interest are acquired 100, and the objects are segmented 102. The features of the segmented objects are extracted 104 and the objects are labeled. After a sufficient number of object features and their corresponding labels are collected, features that allow discrimination between classes of objects are selected 106. The selected features are used as the basis for the construction 108 of the object classifiers. The object classifiers are evaluated 110 to determine if the resulting classifiers sufficiently meet the processing requirements 116. All data and results are stored and manipulated in a common database management system 112. The database system 112 also provides a platform to support data visualization.

During the algorithm clinical knowledge Integration stage, cytotechnologists or cytopathologists define discriminate features. Algorithm developers evaluate the defined discriminant features and define the corresponding computer measurements. In addition, the algorithm developers research literature on automated cytology for information on other computer features that are known to be useful for automated cell classifications. The current imaging system capabilities are evaluated to further refine the feature list. A comprehensive feature list is then generated based on the gathered information.

The selected features are defined in detail and their implementation strategies are specified. After the completion of the specification, the system software group members can implement the features; the algorithm group members verify the feature implementation by comparing the results of independent implementations. After verification, the features are used as the basis for machine training.

Each component of the machine training data flow requires a set of tools to facilitate the successful implementation of the specific training tasks. Two classes of tools are required: object acquisition tools and classifier development tools.

The object acquisition tools include software and hardware tools for image acquisition, image processing and feature extraction, and object labeling. The tools developed include the following: slide bar code reader and PC-based cell coordinate acquisition station, the semi-automatic cell capture program, image saving mechanism for automated acquisition, image processing and feature extraction programs hosted by the algorithm development station, the object labeling stations for entering the object class labels to the database, and the object labeling program.

After training data is collected, many pattern recognition tools are developed to facilitate the classifier development work. These tools include feature selection tools, feature transformation tools, classifier building tools, and classifier valuation tools.

Figure 10:
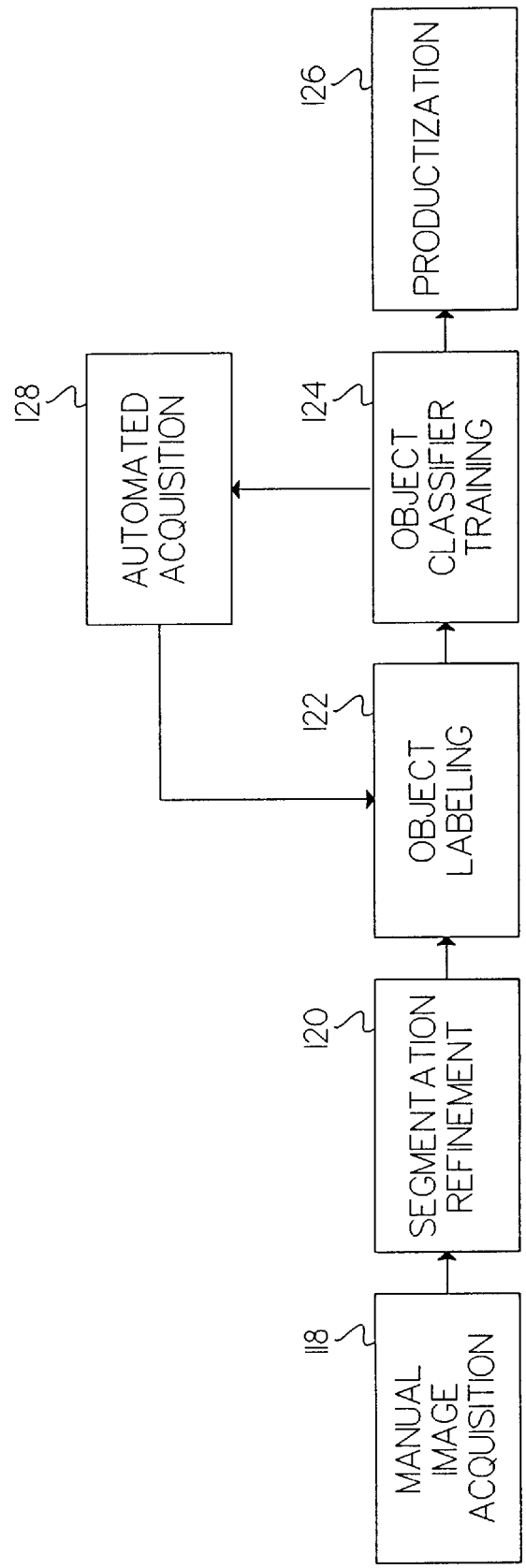
FIG. 10 shows an object classifier training process flow diagram of the method of the invention.

After the preparation phase 80, the algorithm development process moves to the object training phase 82. The inputs to phase 82 include the developed features and training tools. The outputs of object training phase 82 are the developed object classifiers, which have satisfactory performance at the object level. The object training process is shown in FIG. 10. The process follows these steps. Images of the cells of interest are semi-automatically acquired 118. The acquired images are used to refine the segmentation processing 120. The segmented objects are labeled with their true classes 122. The labeled objects are used to perform object classifier training 124. An object classifier is implemented in the system and tested. If the performance of the classifier is unsatisfactory, then objects that the classifier failed to label are acquired in an automated object acquisition mode 128. Steps 122 through 128 are repeated until the performance of the classifier is satisfactory. After a satisfactory classifier is constructed, it may be productized 126 and used to classify biological specimens on microscope slides.

Figure 11:
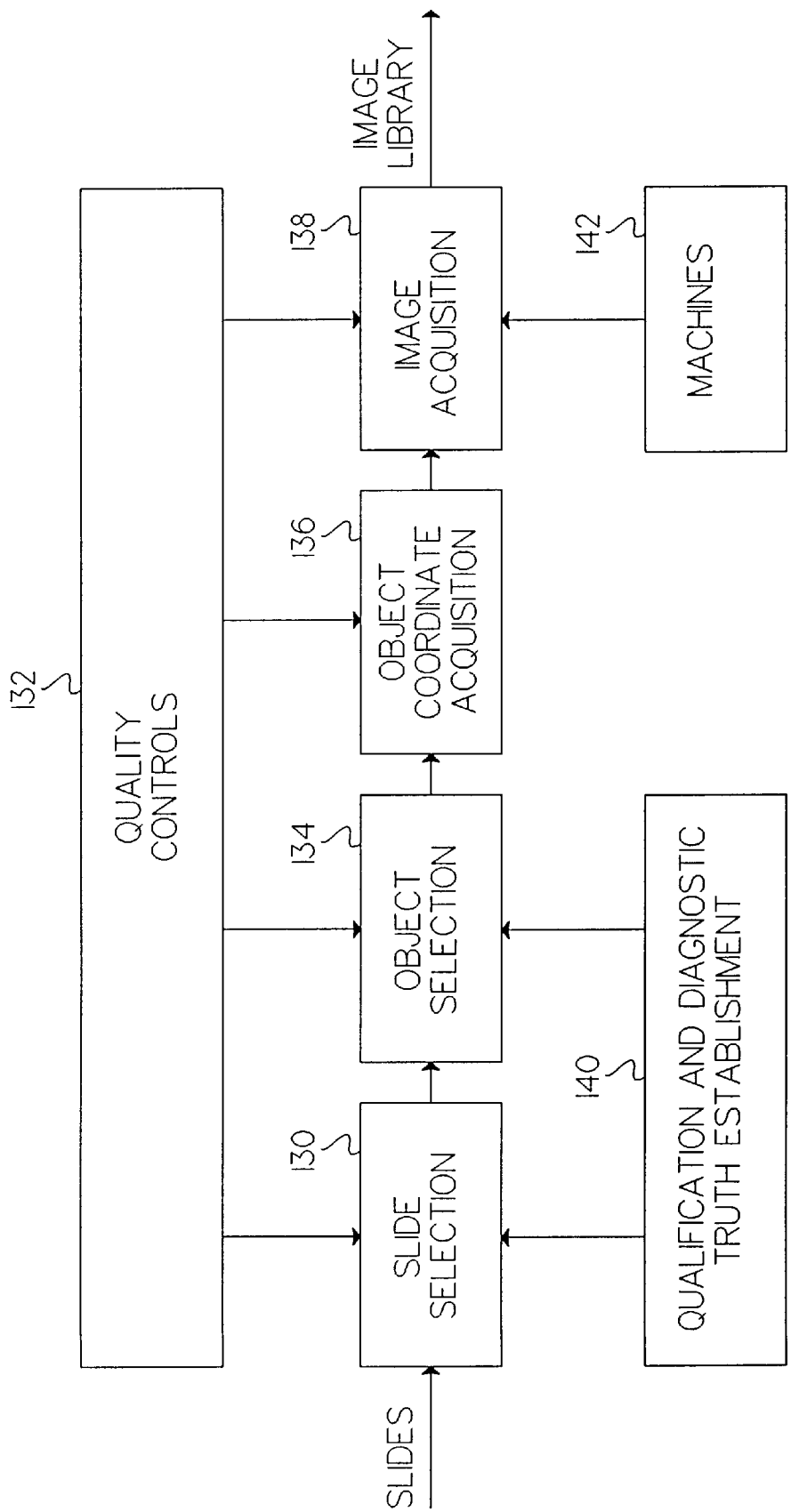
FIG. 11 shows a semi-automatic image processing method.

The semi-automatic image acquisition process is shown in FIG. 11. This process comprises three basic stages: selection, acquisition, and quality controls 132. A slide is selected from the training slide set and qualified 130 subject to quality controls 132. Training object are selected and qualified 134. A slide level diagnosis is established 140. Training object coordinates are acquired 136. Training object images are also acquired 138 from machines 142.

The acquired images are processed by an image segmentation algorithm. The baseline image segmentation algorithm is designed to be as insensitive to image quality variations as possible. This baseline segmentation algorithm can be modified as desired to match the specific image quality and application scenarios. The segmentation refinement is an iterative process through multiple training and testing cycles. The refined segmentation process can be fast ported to speed up the remaining tasks of the training process.

The refined image segmentation process is applied to the acquired images, and the features corresponding to the segmented object masks are extracted and stored along with the object masks. The original images, the segmented object masks, and the features are used by a cell labeling program to label and verify the objects. The object labeling task is conducted by a cytotechnologists following predetermined standards.

After a sufficient number of the objects are acquired and labeled, the training process moves to the object classifier training stage. Object classifier training uses approaches including the development of multi-stage classifiers following a redefined structure, and the balancing of training data for labs, machines 142, and object types.

Figure 12:
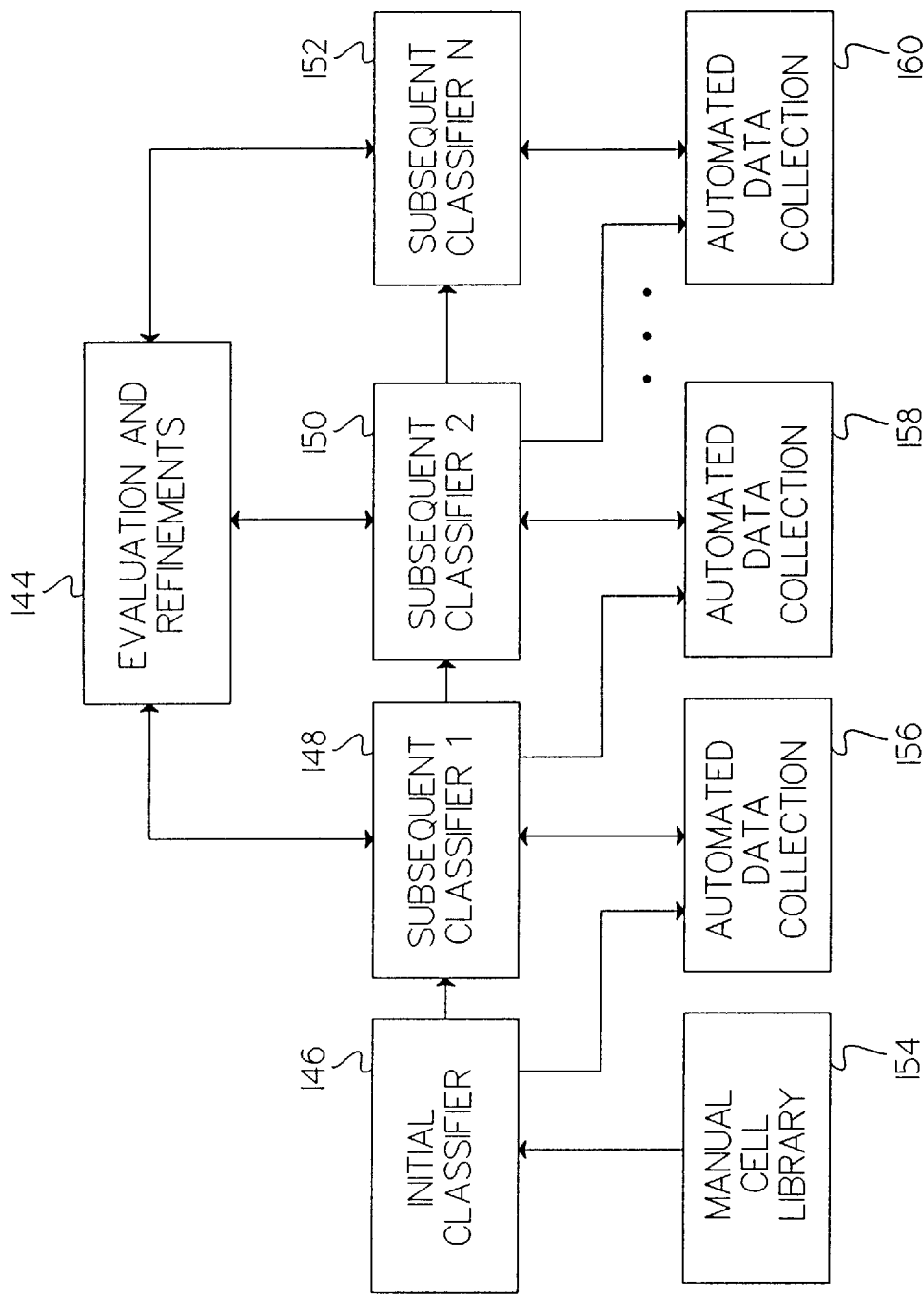
FIG. 12 shows the classifier construction method of the invention.

As shown in FIG. 12, the acquired images from the semi-automatic cell library 154 are used to generate the initial classifier 146. The initial classifier 146 is implemented in the system, and an automated data collection process is conducted to acquire additional training samples. The automated collection data and the semi-automatically acquired data are used to train the subsequent classifiers.

The automated data collection processes 156, 158, and 160 use a focus of attention method in which the newly acquired data are the samples that the current classifiers 148, 150, 152 failed to classify correctly. In addition, this training method requires that the implementation of the intermediate classifiers be the basis for further data collection. As a result, sampling errors can be corrected.

It is not possible to train processes on paper and wait until the whole process is developed before implementing the classifiers. This unique property makes it difficult to follow strictly the conventional waterfall process of software development. Instead, the process group follows a spiral method of development, evaluation, and planning. To collect training data, the same set of slides can be processed multiple times to capture the system variations and improve the robustness of the resulting classifiers. To assure the integrity of the training process, both the machine 142 and the data have to be qualified as part of the process. Many machine monitoring and failure recovery activities are applied throughout the training process.

The object classifier training process is controlled by a classifier evaluation process, which comprises interactive data visualization, feature evaluation, error rate estimation, and clinical verifications. Processes are adjusted and expanded until the performance goal is achieved or failure causes are accepted as system limitations.

Figure 13:
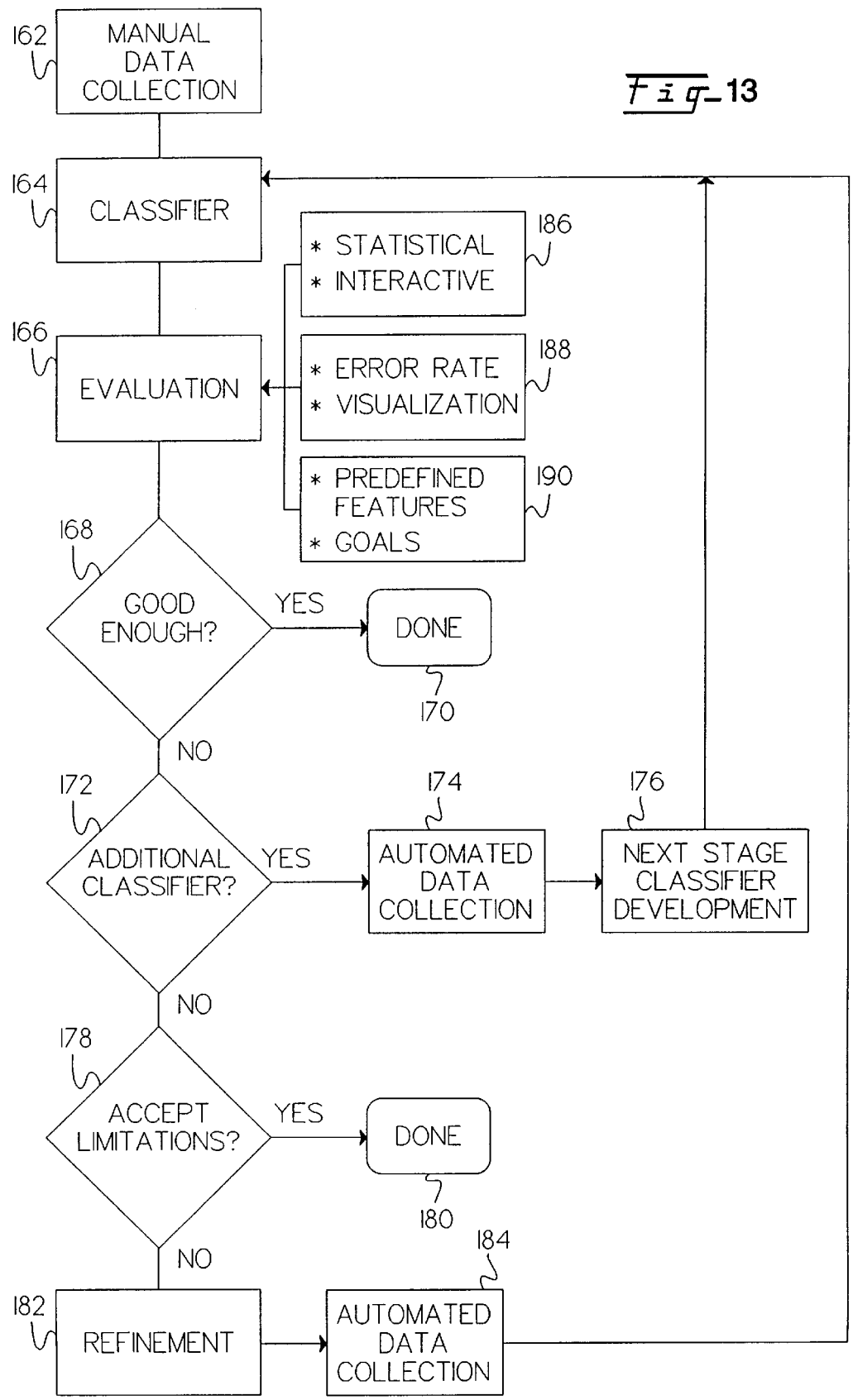
FIG. 13 shows the classifier development process flow diagram of the method of the invention.

As part of the object classifier development process, a classifier development strategy is applied at each stage of the training. The classifier development strategy is shown in FIG. 13. Once a preliminary classifier 164 is developed, the classifier is evaluated 166. The evaluation process comprises statistical analysis and interactive data display and visualization methods to characterize the data distribution and decision boundaries. The basic steps of the classifier evaluation process include the following checks. The error rate of the classifier is determined and assessed 188. The features and images of objects that failed in the classification process are examined and the causes of the failures are determined 186. The features selected by the classifier and the rules of the feature applications are compared with the expected clinically useful features and how they are used 190. The process performance is compared with the predetermined goals 190. If the evaluation results show satisfactory performance 168, the classifier development process is completed 170. If the evaluation results determine the current performance level falls short of the desirable goal, additional decision logic is applied 172.

The next decision is whether an additional classifier should be built 172. This decision depends on the current classifier's sensitivity to the objects of interest. If the sensitivity is high enough (for example, >60%), the process switches to the development of an additional classifier 176, and the evaluation process is activated after the next classifier is developed.

If the sensitivity is low (for example <50%), it is difficult to develop any additional classifiers. At this point, step 178, the classifier can be accepted in spite of its limitations 180, or the classifier can be further refined 182. If the classifier's performance level is not acceptable, and possible improvements to the classifier have been identified, the current classifier may be refined. The refining process comprises acquiring additional data 184 and then rebuilding the classifier using the enlarged data set and refined features.

Process accuracy has the highest priority among performance goals. However, to facilitate the productization of the developed processes, process robustness, throughput, and implementation maturity and maintainability are also evaluated, and if necessary, improved in the process development process.

After the developed object classifiers are integrated into the system, a slide training readiness test is conducted to ensure the quality of object training phase. If the slide training readiness test is completed and the results are satisfactory, the object classifier training phase is considered complete, and the development process moves to the slide evaluation phase.

Quality assurance processes are applied throughout the object training phase. Quality control procedures for data collection, object labeling, and classifier development are defined. Most of the procedures include auditing of the data, comparing the results with the pre-defined goals, and performing discrepancy analysis.

Figure 14:
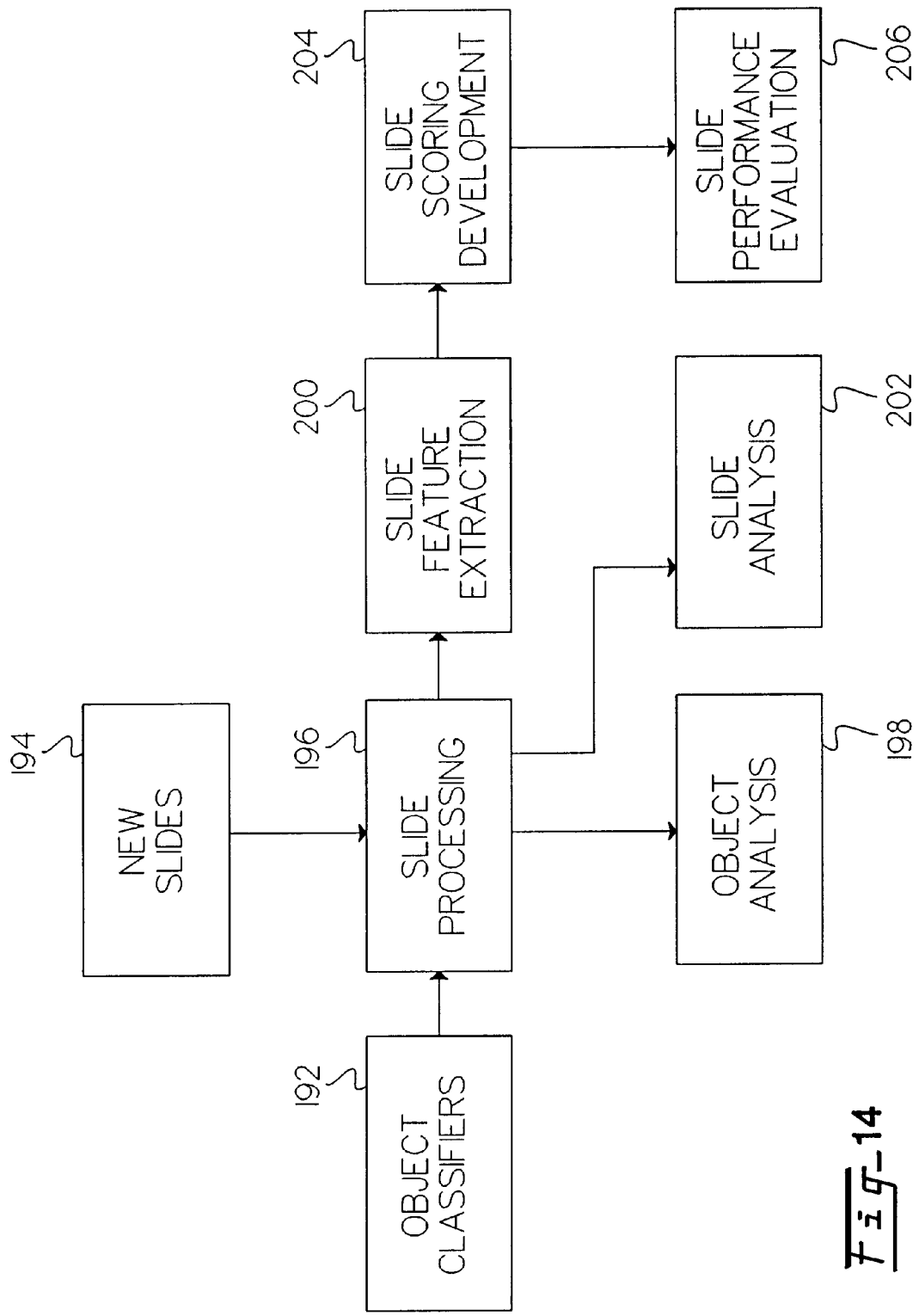
FIG. 14 shows the slide evaluation process flow diagram of the method of the invention.

Now referring to FIG. 14, the slide investigation phase 84 is illustrated. This is the last phase in process development. When the slide investigation phase is completed the developed process is specified and then implemented into the machine to analyze biological specimen slides. The inputs to this phase are the successfully developed object classifiers 192. The objectives of this phase are to further evaluate the object classification results. This evaluation is based on a large set of new slides 194 and the effectiveness of the accumulated classification results on a slide by slide basis.

As shown in FIG. 14, new slides 194 are acquired and processed. Prior to this, an investigation protocol is developed that defines the type and selection criteria of the slides, the configuration of the slide processing, and the data formats. As part of slide processing 196, images having significant objects detected by the object classifiers are saved, and the object classification results are accumulated for each slide. The results are used to evaluate the object classification results.

To specify the truth of the detected objects, cytotechnologists label the images having significant objects in an object analysis procedure 198. The truth labels are used to determine the accuracy of the object classifier. For slides having a high prevalence of abnormal cells and a low number of detected objects of interest, a sensitivity analysis is conducted that saves and labels all the images processed by the process. The sensitivity analysis results also help determine the accuracy of the object classifier.

The object classification results are accumulated over the whole slide, and a slide analysis 202 is conducted. Based on only these results, the accuracy of slide classification is determined and compared with the desirable process performance goals. The object classification results are the foundation of the slide scoring processes; therefore, if the results are very unsatisfactory, a detailed analysis may be required to determine the feasibility of the current system and process approach.

The accumulated object results are used to derive slide features 200. Additional slide features are extracted based on the integration of the results from multiple object classifiers. The slide features and the diagnosis of the slides are used to develop slide scoring processes.

The slide scoring processes 204 are developed using a training process similar to the object training processes. The developed slide scoring processes are then evaluated to validate the overall development process.

In addition to the accuracy analysis, the repeatability and throughput of the object accumulated results are also evaluated to determine whether the object classifiers provide a solid foundation for an acceptable product.

Process robustness, throughput, and implementation maturity and maintainability are also evaluated, and if necessary, improved in the development process.

After the developed slide scoring processes are integrated into the system, a slide scoring evaluation test 206 is conducted. If the results are satisfactory, the slide evaluation phase is complete.

Quality assurance processes are applied throughout the slide evaluation phase. Slide diagnostic truth is establishment follows predetermined guidelines. System qualification and integrity are established during slide processing. In addition, verification of the code is done.

To illustrate the operation of the invention the details of endocervical group analysis will be described. Endocervical group analysis is performed on two sources of input. For each slide, it receives 20x fields of view from the image acquisition module. These FOVs are images that a 4x magnification analysis has determined to have a likelihood of containing groups of cells, whether normal endocervical or potentially abnormal cell groups. During endocervical group detection normal endocervical and abnormal cell groups contained in an image are also detected. The invention classifies all segmented objects in each image and further processes the classification results with a 20x FOV integration analysis for slide classification. Whole image results are also used during thick group analysis.

The endocervical group analysis of the invention starts with images of a cytological specimen and cell results using whole image features. The endocervical group analysis outputs whole image features, which it passes to the thick group process, object and group classification data, if cell groups are found and sent to 20x FOV at integration step and feature active flags.

The endocervical group analysis proceeds initially as follows:

Results from 4x magnification processing and checks bubble edge locations to ensure that all areas inside bubbles are excluded from processing. Areas within bubbles are eliminated from processing because presentation of cells within bubbles may not be reliable.

Cover slip edges are detected and that all areas outside of the area bounded by cover slip edges are excluded from image processing.

Image acquisition assures that images passed to the group process for processing conform to image quality specifications. System software assures that images are acquired based on rules provided in 20x FOV. Endocervical group analysis uses nuclear detection, grouping, and classification techniques to identify probable groups of endocervical cells. The presence of normal endocervical cells in a specimen is a partial indication that the sample was taken from the proper anatomical location, i.e. at the squamo-columnar junction, which is the transformation zone of the uterine cervix. Groups of cells that lie with densely overlapping nuclei are not detected by the endocervical group process. These kinds of groups are detected and classified by thick group analysis. Free lying cells—cells having isolated nuclei—are detected by the single cell processing.

The endocervical group analysis functions to provide an endocervical score which helps to determine whether a specimen has been adequately sampled by the physician who originated the slide. In addition supporting information is supplied to generate an anomaly score. Group analysis operations are divided into five major steps. Processing for each image is completed before the next image is sequenced to the FOV board for processing. Results of each processed field-of-view are accumulated for slide scoring.

step 1

Once an image, which in this context is equivalent to one 20x FOV, has been made available for endocervical group processing, features are calculated in preparation for step 2 classification. This step is called whole image feature extraction.

step 2

The process uses the whole image features provided by the single cell process and calculated during step 1 to classify each image into one of two categories: "no potential for containing identifiable cell groups", or "may contain identifiable cell groups". If an image is classified as having no potential for containing identifiable cell groups, processing ceases for that FOV and results are reported to the 20x FOV integration process and to the thick group process. This step is called FOV classification.

step 3

For each FOV that passes step 2, the process segments objects that may be groups of cell nuclei. If no objects are identified in an image, processing stops for that FOV and results are reported to the 20x FOV integration module and to the thick group process. This step is called image segmentation.

step 4

Next, the process measures feature values—such as size, shape, density, context and texture—for each potential cell grouping detected during step 3. This step is called feature extraction. Features for each object are passed to Step 5.

step 5

Finally, the process classifies each detected object in an FOV using the feature values obtained in step 4. Processing stops here and results for each object are reported to the 20x FOV integration process. This step is called object classification. Classification rules are defined and derived during machine training.

Processing occurs sequentially, one FOV at a time. Each FOV is passed through the five steps outlined above until a determination is made about it. An individual FOV is always passed from Step 1 (whole image feature extraction) to Step 2 (FOV classification). If a determination can be made at this point that the image could not contain potential cell groups, it is eliminated from further processing and its results are passed to the 20× FOV integration process. Otherwise, it is passed to Step 3 for image segmentation. Step 3 either eliminates the image from further processing or decides that it contains segmentable objects which may be cell groups, in which case the FOV is passed to Step 4 for feature extraction. The image is then passed to Step 5 for object classification. Accordingly, there are three possible outcomes for each FOV that enters the flow:

1. Could not contain identifiable cell groups as determined by Step 2;
2. Does not contain identifiable cell groups as determined by Step 3; or
3. Contains objects which are identified as normal endocervical cell groups, potential abnormal cell groups, metaplastic/parabasal groups, uncertain endocervical or metaplastic/parabasal groups, or artifacts.

The first step of processing is whole image feature extraction. A whole image is equivalent to one 20× FOV. The goal of the first step is to measure general image properties in an FOV that may indicate the presence or absence of potential cell groups. This information is then communicated to Step 2, FOV classification. No FOVs are eliminated by Step 1. They are all passed to Step 2 for classification.

Features at this level of processing consist of measurements that can be taken from a whole image. These are features that tend to indicate image content, texture, and contrast across the whole image. Three whole image features are received from the single cell process. These are the single cell results, as input to the endocervical group process. In addition, Step 1 of the endocervical group process calculates two additional whole image features. Generally, the single cell whole image features are measuring the global image intensity and image content of an FOV, while the endocervical group features are measuring texture and contrast in an image that may be the result of edges of potential objects in an image.

Whole image features received from the single cell processing are:
1. High count,
2. High mean,
3. Low threshold.

The endocervical group process calculates two additional features that measure texture and contrast that may be the result of edges of potential objects in an image. These features are:
4. 2×1 edge magnitude
5. 5×5 dark edge strength.

Image (or FOV) classification is Step 2 of the endocervical group process's process. Using the five whole image feature values that were described above, the process uses three box filters to test each image for potential of containing identifiable endocervical or other cell groups. If an image passes these three boxes, processing continues to the next step. If an image does not pass, processing stops for that FOV and results are passed to the thick group process and to the 20× FOV integration process.

Image segmentation is the process of identifying objects of interest within a gray scale image and creating an object mask, which is a binary image that represents the objects of interest. Each area of interest is represented as active pixels in the object mask. The group process's strategy for locating potential endocervical groups is to identify probable cell nuclei and determine whether any nuclei lie in close proximity in sufficient numbers to be part of an endocervical group. Once a group has been segmented, nuclei and cluster masks are provided for each object for use by the feature extraction software described herein.

Since endocervical cell nuclei tend to lie in such close proximity as to be overlapping, and since a Papanicolaou-prepared cervical smear typically contains a large number of objects that mimic cell nuclei in appearance, most of the image processing effort is expended to identify cell nuclei. Image segmentation for the group process follow four major steps. Initially, objects other than nuclei are removed from an image. Next thresholds are calculated to identify each nucleus. Segmented objects are checked to ensure that they represent nuclei. Finally, nuclei are examined to determine if they lie in clusters.

Nuclear segmentation progresses through four major steps including background object removal, image thresholding, object refinement, and nuclei clustering. These steps contain several substeps. Background object removal comprises two steps:
1. Large object removal, and
2. Small object and odd shaped object removal.

Image thresholding comprises
3. Threshold calculation.

Object refinement comprises three steps
4. Weak edged object removal,
5. Nuclear separation (for nuclei whose masks are joined), and
6. Small hole filling.

Since nuclei have a finite size range, all objects outside that range are removed first. Along with small objects, thin objects are removed since nuclei tend to be round or ovoid. A threshold is calculated for the identification of areas of the image which may contain nuclei. Once areas for nuclei have been identified, each potential nucleus is checked to ensure that it has sufficient edge contrast around its entire perimeter. Those that do not meet this criterion are removed. Nuclei masks are checked to see if they may actually be two nuclei connected together. If so, they are separated. Finally, if small holes remain in the nuclei masks, they are filled.

Large objects may be cell cytoplasm, mucous streams, or non-cellular artifacts. Such objects are removed from further consideration by an image closing operation that uses a structuring element larger than the largest nucleus. This closed image is then conditionally eroded using the original image as the conditional image. The result is an image with no detail smaller than the structuring element used for the closing operation. The original image is subtracted from the closed image, yielding an image that contains only the detail of the largest possible nuclei and smaller objects. The product of this step is called a residue image.

Objects that are too small or thin to be endocervical nuclei are removed by checking to see if any of the residue objects in the residue image can be removed by opening with a structuring element smaller than the smallest acceptable nucleus. Essentially, this check makes sure that each object's minimum diameter is larger than a minimum size. If an object does not pass, it is removed from the residue image.

During the development of the nucleus segmentation process, two different methods of thresholding nuclei were found to be effective. Each had its own advantages. One method segmented the majority of nuclei and generally segmented nuclei entirely with little oversegmentation. The problem was that it created a large number of false nuclei as well. The second method led primarily to segmentation of nuclei of interest with few false nuclei. This method, however, did not do an adequate job of segmenting each nucleus in its entirety. It was therefore decided to use a combination of the two segmentation methods. The first method provides a formation mask into which a nuclear seed mask—the result of the second method—can be grown. The net result is well formed nuclei with few false nuclear segmentations.

Each thresholding method creates an image. These two images are used to apply thresholds to a modified residue image. Thresholding occurs pixel by pixel. Information about each pixel and its environment is used to decide whether a pixel is part of the background or part of a nucleus. The context of each pixel is found in the pixel itself, the pixel's immediate surroundings, and the entire image around the pixel. Each pixel's threshold value is calculated from individual pixel values, local area parameters, and whole image parameters. The formation mask uses local area information for thresholding while the nuclear seed mask uses all three.

The original image provides background information needed for the thresholding of the formation mask. If nuclei are free lying, their thresholds should be higher than if the nuclei lie in dark backgrounds. The original image is adjusted so the background information is at an appropriate level for thresholding the modified residue image. The image is adjusted by scaling, biasing, blurring and clipping. Scaling and biasing ensure appropriate threshold levels. Blurring removes information other than background from the threshold image. Clipping assures that nuclei have at least a minimum residue strength before they are included in the mask.

Several images are combined to form the threshold image for the nuclear seed mask. Additional object information is added to the modified residue image for increased effectiveness. Images are created to reflect information in this new modified residue (nmr) image. They are combined and used as the threshold image for the nuclear seed mask. Additional object information is added to the modified residue image using binomial filter residue near objects that have been closed. This filter residue is an additional measure of contrast in areas around objects and provides a more robust selection of objects.

Two whole image parameters—edge and brightness—are used to create a threshold image for the nuclear seed mask. Edge, which is a measure of medium to high spatial frequency content of an image, is the average of a binomial filter residue and a dilation residue of the original image. Brightness is the average pixel value in the original image.

Three additional images are created from the nmr image. The first is an object edge image. It is a dilation of the nmr image with the nmr and an eroded nmr subtracted from it. This is expressed as:

$$(NMR(3\times3))-NMR-(NMR\ominus(3\times3)).$$

The result is an image which has object edges only. The second image is the nmr image for selected objects. Each object has some strength associated with it. If that strength is greater than a value calculated from the edge and brightness values just described, the object is part of the second image. This image increases the threshold for those objects that may be two nuclei close together. The increased threshold helps to ensure that nuclei are segmented separately. The third image is just the new modified residue image. Each of the three images is scaled and added together to form the threshold image for the nuclear seed mask. A comparison is then made between the combined image and the nmr image. Resulting nuclei are conditionally dilated with the formation image.

There may be objects other than nuclei represented by the nuclei mask. One property that can be exploited to remove false nuclei is that nuclei are circular objects that are generally darker than their surroundings. A circular edge that goes from bright to dark as one moves from background into the nucleus should exist near the perimeter of each object. Two image parameters, edge and brightness, determine how strong edge contrast needs to be before it is considered to be sufficient. Edge strength is checked for each object in four directions: vertical, horizontal, diagonal up and diagonal down. If edge contrast is strong enough in all four directions, the nucleus is retained. Otherwise the object is removed from the nuclei mask.

Objects may remain as part of the nuclear mask that actually represent two nuclei. If the objects can be separated based on shape, that is if the mask object has an hourglass shape, they are separated. Each object is eroded and checked to see if it breaks into two reasonably sized objects. If so, the original object is split along a line that goes between the two objects in the eroded version of the object. If an object did not split during the erosion process, it is eroded again then the object is checked to see if it split. If the object does not split after three attempts, or if the object gets too small, the object is considered to be one nucleus and no modification is made to the nuclear mask.

Nuclei that remain in the nuclei mask at this stage may need to be cleaned up. Nuclei may have small holes in them or jagged edges on their perimeters. These flaws are corrected by closing and opening the nuclear mask where appropriate.

Once nuclei have been recognized, nuclear clusters need to be identified for use in the feature extraction step. Groups of endocervical cell nuclei tend to lie in close proximity to each other. Just how close they lie tends to depend on nucleus size. In other words, when nuclei are large, the distance between nuclei in endocervical groups is large. Small endocervical nuclei lie close together within a group.

To achieve clustering dependent on nuclear size, a nuclear mask is separated into four parts. The four masks contain nuclei that remained after successively larger erosions. This way nuclei are ordered by size. The mask that holds the largest nucleus is then dilated. The mask that holds the second largest nuclei is dilated, but by a smaller amount.

Each of the four masks is dilated by an amount related to the size of nuclei contained in the mask. All four masks are logically OR'd together. Nuclei that are part of the same group will now overlap, forming clusters. Objects or clusters that are larger than some minimum are retained as potential endocervical groups. Nuclei associated with the retained clusters are retained, and both the nuclei mask and cluster mask are made available for use by the feature extraction step.

After segmentation is complete, segmented objects are passed to the group process's feature extraction level. Once possible cell groups are identified by image processing, features (which are properties of segmented objects) of each cell group are measured. Specific features are chosen which provide the best discrimination between different cell group types and artifact groups.

A wide range of feature types is necessary for good identification of segmented groups. Features used can be looked at and categorized in two different ways. They can be identified by the kind of information they measure—object shape, size, and texture for example. Or, features can be identified by what part of an image they measure—the object of interest, a small area around the object, the whole image, or combinations of these features. Object area measurements attempt to characterize the object itself, while other area measures try to characterize the object's surroundings; they are an attempt to provide cell group contextual information. Combined features measure how an object appears compared to its surroundings.

Features are grouped for discussion first by the image area they are calculated over and second, by what type of measurement is being made. Features are uniquely named and identified logically in the form of feat 099, which means, of course, Feature 99. See Appendix A for information about the entire group of features and how they are allocated to the various cell classification levels. After features have been extracted for an object, object classification is finished.

Features measured in the cluster area form the most diverse set. They may be calculated from nuclei, cytoplasm density, size, shape, texture, orientation, or from a ratio of nuclear and cytoplasm density, texture, or area. Features used from the cluster area only are described next. They are categorized according to the general kind of information they measure.

Feature 7 is the average intensity—or pixel value (0 to 255)—of the non-nuclear cluster area. This feature provides information on whether a cluster is located on top of other objects or if it's densely packed.

Feature 111 is the average of nuclear edge contrasts. If a nucleus is oddly shaped, it may not have a very reliable measure; in other words it may be poorly segmented. Only so-called "good" nuclei are used in conjunction with this feature. Feature 111 is the average difference between pixel intensity values two pixels inside good nuclei, and pixel intensity two pixels outside good nuclei. This gives some measure of nuclear intensity without influence from background light levels. It may also provide a measure of segmentation reliability.

Feature 116 is the standard deviation of the average optical density of "good" nuclei. This measure is an indication of how different one nucleus is from another within the group; that is, how much nuclear intensity varies from nucleus to nucleus. This measurement is taken only on "good" nuclei.

Feature 119 is the average of the normalized nuclear optical densities of good nuclei. Optical density of each nucleus is normalized by subtracting the average optical density of a ring around nuclei from the average optical density of the nuclei. If objects other than nuclei themselves are in the optical path, normalization removes the effect they have on measuring nuclear optical density.

Feature 5 is the area, in pixels, of the cluster mask. Feature 103 is the average area, in pixels, of "good" nuclei.

Feature 104 is the standard deviation of the areas of "good" nuclei.

Feature 125 is the average perimeter of all nuclei. The perimeter of each nucleus is the average of the perimeter of the nuclear mask and the perimeter of the same mask expanded by one pixel.

Feature 126 is the standard deviation of the perimeters of all nuclei.

Feature 6 measures the compactness of the cluster mask. Compactness is calculated as the perimeter squared divided by the area of the object. The compactness of a circle is about 1.27; the compactness of a square is about 16. This is a measure of how smooth and/or round the perimeter of an object is. The higher the number the less smooth the perimeter or round the object.

Feature 99 is the number of good nuclei in the group. "Good" is defined as having a compactness of less than 12. When compared with the number of nuclei segmented, this feature can give some indication of how well segmentation worked. It may also be interpreted to give an indication of how difficult the segmentation task was.

Feature 106 is deviation of the nuclear compactness of all nuclei. This measure can indicate how much the shapes of nuclei in the cluster vary.

Feature 8 is standard deviation of the pixel intensity of non-nuclear pixels in the cluster. This gives some indication of the texture in the cytoplasm around the nuclei.

Feature 13 is called 2×1 (2 pixels horizontally by 1 pixel vertically) bright edge directional disparity within the cluster. Bright edge directional disparity is a combination of two measures. Pixels are examined to find those that have darker neighbors on both sides horizontally, then those that have darker neighbors vertically. For each pixel that passes the neighbor test, the magnitude of the difference is recorded. The magnitude of differences for all horizontal pixels are summed. Then all pixels in the vertical are summed.

Feature 13 is calculated as the minimum of these two values divided by the sum of the two. It provides a measure of whether there are significantly more relatively bright pixels in one direction versus the other. This feature shows whether there is some directionally dominant texture in the cluster. In this case, the texture is very fine, or of a high spatial frequency.

Feature 14 is called 5×1 bright edge magnitude. As with the directional disparity described in Feature 13, this measure is made up of two directions: horizontal and vertical. In this case, rather than looking for pixels that are surrounded by dark pixels in one direction, groups of three pixels are examined to see if they are bounded by dark pixels on both sides horizontally and vertically. Feature 14 is calculated by squaring the two measures, summing them, then taking their square root. This feature gives a measure of how much edge there is in the cluster that is about three pixels wide in either direction. It also gives a measure for the amount of texture there is that has bright spots about three pixels in size.

Feature 15 is called 5×1 bright edge directional disparity. This measure is the same as Feature 13 except that groups of three pixels are checked for dark neighbors rather than a single pixel. This feature measures directional dominance of texture in the cluster. The texture measured here is bright regions three pixels wide or high.

Feature 18 is 3×3 bright edge strength. The process searches for pixels that have dark pixels around them in all directions. The difference between the bright pixel and its surrounding pixels are accumulated for all such pixels in the cluster. The accumulated figure is normalized by the total number of pixels in the cluster. This feature measures the amount of texture in each cluster that comprises bright regions about one pixel in size that are surrounded by darker pixels on all sides.

Feature 20 is 17×17 bright edge strength. This is similar to Feature 18 except that the bright region searched for is about 15×15 pixels rather than about one pixel. This measure looks for texture with bright spots that measure 7 to 10 microns on a side.

Feature 21 is the magnitude of the 2×1 dark edge. This feature is the same as Feature 14 except that dark pixels are searched for rather than bright regions 3 pixels wide. This measure is of the total amount of dark area covered by single pixels bounded in two directions by bright area.

Feature 25 is the magnitude of the 9×1 dark edge. This feature is the same as Feature 21 except that regions of 7 pixels in width or height are searched for that have bright neighbors.

Feature 27 is 5×5 dark edge strength. This feature is similar to Feature 18 except that a dark region is searched for that is about 3×3 pixels rather than about one pixel. This measure looks for texture with dark spots that measure 1 to 2 microns on a side.

Feature 28 is 9×9 dark edge strength. This is the same as Feature 27 except the size of the dark region searched for is about 7×7. The texture this feature measures are dark spots about 4 microns on a side.

Feature 29 is 17×17 dark edge strength. This feature is the same as Feature 20 except that dark regions are searched for rather than bright.

Feature 30 is called mean 3×3 blur residue in the cluster. The process measures the absolute difference between a 3×3 binomial filtered image and its original. The average pixel value of this difference is Feature 30. This feature measures high spatial frequency in the cluster.

Feature 31 is called standard deviation of the 3×3 blur residue in the cluster. This measure gives some indication of how uniform high spatial frequencies are within the cluster.

Feature 121 is the average of the standard deviation of pixel values within each of the "good" nuclei. This gives an average range of values for pixels in the cluster.

Feature 136 is 3×3 dark edge strength within the "good" nuclei. This measure is the same as that described in Feature 18 except that the search is for dark regions within the "good" nuclei. This feature measures small dark spots in nuclei.

Feature 9 is average internuclear skiz distance. Skiz points are points that are not within nuclei and are equidistant from their two closest nuclei. Feature 9 is the average distance from the nuclei of each of these points in the cluster. This measure gives a value for how closely oriented nuclei are within the cluster.

Feature 42 is polarity area within the cluster. This is a measure of how many ovoid dark areas are within the cluster area. If there are a lot of dark regions that are ovoid, the number here will be large. If dark areas tend to be circular, the number will be smaller.

Feature 101 is the average minimum nucleus-to-nucleus distance between the "good" nuclei. This gives a value for how closely oriented "good" nuclei are within the cluster.

Feature 2 is a measure of the nuclear/cytoplasm relationship. It is the ratio of the standard deviation of the average nuclear intensities to the standard deviation of the non-nuclear cluster intensities. This measure indicates how much average intensities of nuclei vary when compared with that of surrounding cytoplasm.

Feature 3 is also a measure of the nuclear/cytoplasm relationship. It is the ratio of the total nuclear area to the total non-nuclear area. This measure gives information about the nuclear/cytoplasm area ratio for objects in the cluster. It also provides an indication of the proximity of nuclei within the cluster.

Contextual information can be thought of as what company each object keeps, or what's around the edges of an object. One way to get a measure of contextual information is to calculate features in regions external to the cluster. Several features relating contextual information of this kind are used in the object classifiers. They are described next.

Feature 77 is the magnitude of the 2×1 dark edge in the ring around the cluster. This is the same as Feature 21 except that it's calculated in the ring around the cluster rather than in the cluster.

Feature 81 is the magnitude of the 9×1 dark edge in the ring around the cluster. This is the same as Feature 25 except that it's calculated in the ring around the cluster rather than in the cluster.

Feature 83 is called 5×5 dark edge strength. This is the same as Feature 27 except that it's calculated in the ring around the cluster rather than in the cluster.

Feature 84 is called 9×9 dark edge strength. This is the same as Feature 28 except that it's calculated in the ring around the cluster rather than in the cluster.

Feature 86 is the 3×3 blur residue mean. This is the same as Feature 30 except that it's calculated in the ring around the cluster rather than in the cluster.

Feature 88 is 3×3 blur residue skewness. This measure indicates how uniform high spatial frequencies are within the ring around the cluster.

Feature 91 is called 7×7 blur residue standard deviation. The process measures the absolute difference between an original image and the image blurred with a 7×7 binomial filter. Feature 91's value is the standard deviation of the residue from all the pixels in the ring around the cluster. This feature measures uniformity of the residue values from the 7×7 blur. Blur uniformity indicates how variable texture is within the area being measured.

Feature 72 is the maximum polarity in the ring around the cluster. This feature is the same as Feature 42, except that its polarity is broken down further into its maximum direction, its direction perpendicular to the maximum, and its direction to 45 degrees on either side of the maximum. Polarity in the maximum direction in the ring around the cluster gives the value for Feature 72.

Combined features are calculated using both cluster and ring measures. These features provide another measure of contextual information about a cluster. First, calculate feature values for both the cluster and a ring around it. Next, combine that information in a way that reduces the effect that background "stuff" has on the cluster itself. These so-called "normalized" features are described in this section.

Feature 48 is the average brightness of the normalized cluster. The average intensity of the cluster is divided by the average intensity of the ring around the cluster. This ratio is average brightness.

Feature 51 is the magnitude of the 5×1 dark edge. This feature is similar to Feature 21 except it searches for a 3-pixel region of dark area rather that a 1-pixel region. Its value is a ratio of the features that are calculated for the cluster and the ring around the cluster. Feature 51 is the ratio of Feature 79 and Feature 23.

Feature 52 is the directional disparity of the 5×1 dark edge. Feature 52 is like Feature 51 except that its ratio is not of the 5×1 magnitude. Rather, it is of the 5×1 directional disparities of the cluster and ring around the cluster.

Feature 55 is called 5×5 dark edge strength. This is the ratio of Feature 27 and Feature 83, both of which were just described.

Feature 58 is called 3×3 blur residue mean. This is the ratio of Feature 30 and Feature 86, also just described.

Feature 64 is 7×7 blur residue skewness. This is the ratio of the 7×7 blur residue skewness of the cluster to that of the ring around the cluster. This ratio indicates how texture variations compare from the cluster to the ring around the cluster. It identifies changes in texture from the cluster to the ring around the cluster. It also provides a measure of how similar the cluster is to its background when its spatial frequencies have been eliminated by a 7×7 filter.

Whole image measurements are the second most diverse category of features. (A whole image is equivalent to one 20× FOV.) These features represent a third way that contextual information can be measured for a cluster. Several of these features are provided by the single cell process; others are calculated during the segmentation portion of the group process.

Feature 146 is the single cell process's high_count variable measurement, which measures dark edge gradient content of the whole original image. This is a measure of how much cellular material may be in the image.

Feature 147 is the single cell process's high_mean variable measurement. This is the average value of all pixels in an image that have values between 199 and 250. This feature provides some information about an image's background.

Feature 151 is the "edge" variable determined during group segmentation. It is a combination of a 3×3 dilation residue and a 3×3 blur residue which is averaged over the whole image. This feature measures high spatial frequency and dark edge content of an image. It gives an indication of how much detail the image contains.

Feature 152 is the magnitude of the 2×1 dark edge in an image. This feature is calculated in the same way as Feature 21 except that it is calculated over the whole image.

Feature 153 is directional disparity of the 2×1 dark edge. This feature is calculated the same way as Feature 14 except that 1-pixel dark spots are searched for over the whole image.

Feature 154 is the magnitude of the 5×1 dark edge in an FOV. This feature is calculated the same way as Feature 152 except that dark 3-pixel regions are searched for instead of single dark pixels.

Feature 157 is 9×1 dark edge directional disparity. This is calculated the same way as Feature 153 except that 7-pixel dark regions are searched for rather than dark regions of single dark pixels.

Feature 158 is 5×5 dark edge strength. This feature is the same as Feature 27 except that it is calculated over the whole image.

Feature 160 is 17×17 dark edge strength. This feature is the same as Feature 29 except that the feature is calculated over the whole image instead of just the cluster.

Feature 161 is 3×3 blur residue mean. This is calculated the same way as Feature 30 except that the feature is calculated over the entire image rather than just over the cluster.

Feature 162 is 3×3 blur residue standard deviation. This feature is measured the same way as Feature 31 except that it is calculated over the whole image.

Feature 165 is 7×7 blur residue mean. This feature is the same as Feature 161 except that lower spatial frequencies are measured over the whole image.

Feature 166 is 7×7 blur residue standard deviation. This is the same as Feature 91 except that it is calculated over the whole image.

Feature 169 is 15×15 blur residue mean. This feature is calculated the same way as Feature 165 except that a 15×15 binomial filter is used rather than a 7×7 binomial filter.

Feature 173 is standard deviation for the whole image. This is the standard deviation of the pixel values for every pixel in an image. This feature provides a measure of the amount of variation in pixel intensity there is across the entire 20× FOV.

Feature 174 is whole image skewness. This feature is the skewness of the values of every pixel in an image. It is a measure of how much pixel values are biased to one side or the other of mean pixel intensity. Skewness provides a measure of image content.

Feature 149 is the single cell process's low_threshold value. This value is calculated during single cell segmentation. It is the result of an adaptive threshold calculation for a certain range of pixel intensities in an image. It gives a measure for how much dark matter there is in an image. If the threshold is low, there is a fair amount of dark matter in the image. If the threshold is high, there are probably few high density objects in the image.

The fifth and final step of image processing is called object classification. Each detected object is classified in an FOV according to values which were obtained during the feature extraction process. Classification rules were defined during machine training.

Object classification is made by sets of statistical decisions through several levels of classification. Each classifier compares a set of features, unique to that classifier, measured from an object to decision boundaries which were determined during classifier training. Every segmented object is passed through filters and classifiers until the process reaches a classification determination. When a decision is made about an object, for example by one of the early box filters, results for that object (which are either artifact group or potential abnormal group) are reported. On the other hand, as long as a potential cell group cannot be identified, it continues down through filters and classifiers until a decision is reached regarding its classification. It may be useful to refer back to the five major steps of the endocervical group process's process described herein above.

Feature extraction (Step 4) and object classification (Step 5) are described separately, both occur simultaneously, over and over in sequence, until a decision is reached for a particular object. A segmented object from Step 3 enters the process at Step 4's first filter, which is the cytoplasm box filter. Two features for that object are measured and extracted according to that filter's feature set (Features 2 and 106 in this case). If a determination can be reached by the first filter, processing for that object ceases, its results are reported, and feature extraction and object classification begin for the next segmented object in the current FOV. If a determination cannot yet be reached for an object, it is passed to the next processing level. Features are extracted at each classification level until the object is classified as an artifact, a probable endocervical cell group, a probable metaplastic/parabasal group, an uncertain endocervical/metaplastic/parabasal group, or a potential abnormal cell group.

For each segmented object, feature extraction and object classification occur over and over until a determination is made. As soon as an object is classified, processing ceases at that level and the next object enters at level 1 for feature extraction and possible classification. The process's 14 layers of processing are:

1. cytoplasm box filter,
2. poly box filter,
3. miscellaneous box filter,
4. out of focus box filter,
5. graphite box filter,
6. bubble edge box filter,
7. 1st abnormal box,
8. 2nd abnormal box,
9. 3rd abnormal box,
10. stage 1 classifier,
11. stage 2 classifier,
12. stage 3 classifier,
13. post stage 3 box filter, and
14. object ID classifier.

The process tracks and accumulates results in each FOV so that classification of each object in an FOV is known. When the process has made a determination for all objects in an FOV, results are reported to and accumulated by the system software and the 20× FOV integration process. Only then can image processing and classification begin for the next FOV.

After FOV segmentation is finished, objects are subjected, one at a time, to a series of box filters. These simple classifiers perform threshold calculations using a pair of features.

The cytoplasm box filter is used to eliminate as many objects as possible that are cytoplasm artifacts. This filter relies on two features which it calculates in the cluster area. One is a measure which compares texture of nuclei to that of the surrounding cytoplasm. The other feature is a measure of the variation in nuclear shapes. These two features help identify objects where cytoplasm is incorrectly identified as nuclei in a significant number of cluster nuclei.

The purpose of the poly box filter is to classify and eliminate from further processing segmented objects which are polymorphonucleocytes, commonly called polys. This filter uses two features which it calculates in the cluster area. The first feature measures the amount of small dark material in the cluster area. The second feature measures contrast, which can be thought of as texture, in the cluster area. Polys have small dark nuclei which tend to be very dark when compared to their surroundings.

The filter removes many additional objects which clearly are not of interest. It uses two features which it calculates in the cluster area. The first feature calculates average nuclear perimeter, and the second measures high spatial frequency in the cluster.

The out of focus box filter is designed to remove objects that were poorly focused during image acquisition. Since identification of out of focus objects is unreliable, the process should not attempt to classify them. The first feature is measured in the cluster. It looks for high spatial frequencies. High spatial frequency is not typically observed in out of focus objects.

Glass laboratory slides of Pap smears commonly contain artifacts which prove to be graphite particles left by pencils. Since small particles of graphite can mimic nuclear clusters, it is useful to eliminate these artifacts early in processing. Because graphite particles are very dark, this filter's two features measure contrast in the cluster area.

The endocervical group process may segment the edge of a bubble, mistaking it for an object. Segmented bubble edges appear as long, thin, dark objects. The first feature used by this filter is measured in the cluster and ring, then normalized. It looks for texture that is preferential in one direction, which is indicative of long thin objects. The second feature measures average minimum nuclear separation, which is generally quite small in segmented bubble edges.

For all objects that remain after the initial box filters, a check is made to determine if the objects are potentially abnormal, i.e. adenocarcinoma or high grade cell groups. If the first abnormal box identifies an object as potentially abnormal, that object is passed to the second abnormal box filter. Otherwise the object is passed to the Stage 1 classifier. The first and second abnormal box filters make no final classification determinations. If an object is called potentially abnormal at the third abnormal box, processing ceases for that object and it is called potentially abnormal. Otherwise the object goes to the Stage 1 classifier.

Tables 4.1, 4.2 and 4.3 illustrate feature allocation for the three abnormal box filters. Table 4.1 illustrates how the first abnormal box filter's features are used. One density feature is measured in the cluster, and one density feature is measured over the whole image. One size feature is measured in the cluster area, and so on.

TABLE 4.1

| CHARACTERISTICS | Cluster | ring around cluster | ring and cluster combined | whole image |
|---|---|---|---|---|
| density | 1 | — | — | 1 |
| size | 1 | — | — | — |
| shape | — | — | — | — |
| texture | 2 | 2 | — | 1 |
| orientation | 1 | — | — | — |
| N/C texture | — | — | — | — |
| N/C size | — | — | — | — |
| content | — | — | — | 1 |

TABLE 4.2

| CHARACTERISTICS | Cluster | ring around cluster | ring and cluster combined | whole image |
|---|---|---|---|---|
| density | — | — | — | 1 |
| size | 3 | — | — | — |
| shape | — | — | — | — |
| texture | 3 | 2 | — | 1 |
| orientation | — | — | — | — |
| N/C texture | — | — | — | — |
| N/C size | — | — | — | — |
| content | — | — | — | 1 |

TABLE 4.3

| CHARACTERISTICS | Cluster | ring around cluster | ring and cluster combined | whole image |
|---|---|---|---|---|
| density | — | — | — | — |
| size | 1 | — | — | — |
| shape | — | — | — | — |
| texture | 3 | 3 | — | 5 |
| orientation | — | — | — | — |
| N/C texture | — | — | — | — |
| N/C size | — | — | — | — |
| content | — | — | — | — |

Stage 1 is a Fisher's linear binary decision tree. Objects passed to the Stage 1 classifier should be normal or artifact groups. The Stage 1 classifier either identifies an object passed to it as an artifact, or it passes the object to the Stage 2 classifier for further refinement. Allocation of these features is illustrated in Table 4.4. See Table A.1 for more information about the feature in these and the other feature sets.

TABLE 4.4

| CHARACTERISTICS | Cluster | ring around cluster | ring and cluster combined | whole image |
|---|---|---|---|---|
| density | 1 | — | 1 | 1 |
| size | 1 | — | — | — |
| shape | — | — | — | — |
| texture | 4 | — | 2 | — |
| orientation | 1 | — | — | — |
| N/C texture | — | — | — | — |
| N/C size | 1 | — | — | — |
| content | — | — | — | — |

Stage 2 is a Fisher's linear binary decision tree. Objects passed to Stage 2 are either classified as artifacts, or they are passed to the Stage 3 classifier for further refinement. Table 4.5 illustrates how Stage 2's features are allocated.

TABLE 4.5

| CHARACTERISTICS | Cluster | ring around cluster | ring and cluster combined | whole image |
|---|---|---|---|---|
| density | 1 | — | — | 1 |
| size | 1 | — | — | — |
| shape | — | — | — | — |
| texture | 1 | — | — | 7 |
| orientation | 3 | 1 | — | — |
| N/C texture | — | — | — | — |
| N/C size | — | — | — | — |
| content | — | — | — | — |

Stage 3 is a Fisher's linear binary decision tree. Objects passed to the Stage 3 classifier are either identified as artifacts, or they are passed to the post-Stage 3 box filter. Table 4.6 illustrates how Stage 3's features are allocated.

TABLE 4.6

| CHARACTERISTICS | Cluster | ring around cluster | ring and cluster combined | whole image |
|---|---|---|---|---|
| density | — | — | 1 | — |
| size | 1 | — | — | — |
| shape | — | — | — | — |
| texture | 6 | — | 1 | — |
| orientation | 1 | — | — | — |
| N/C texture | — | — | — | — |
| N/C size | — | — | — | — |
| content | — | — | — | — |

TABLE 4.7

| CHARACTERISTICS | Cluster | ring around cluster | ring and cluster combined | whole image |
|---|---|---|---|---|
| density | — | — | — | — |
| size | — | — | — | — |
| shape | 2 | — | — | — |
| texture | — | 1 | — | 2 |
| orientation | — | — | — | — |
| N/C texture | — | — | — | — |
| N/C size | — | — | — | — |
| content | — | — | — | — |

The object ID classifier is a Fisher's linear binary decision tree. Most objects passed to the object ID classifier are either endocervical cell groups or metaplastic/parabasal cell groups. This classifier identifies objects as probable endocervical, probable metaplastic/parabasal, or uncertain endocervical/metaplastic/parabasal.

TABLE 4.8

| CHARACTERISTICS | Cluster | ring around cluster | ring and cluster combined | whole image |
|---|---|---|---|---|
| density | 2 | — | — | — |
| size | — | — | — | — |
| shape | — | — | — | — |
| texture | 4 | 1 | — | — |
| orientation | 1 | — | — | — |

TABLE 4.8-continued

| CHARACTERISTICS | Cluster | ring around cluster | ring and cluster combined | whole image |
|---|---|---|---|---|
| N/C texture | — | — | — | — |
| N/C size | — | — | — | — |
| content | — | — | — | — |

When the endocervical group process has finished processing a slide, it has made a decision about each FOV and about every segmented object in each FOV. A slide's FOVs have been classified as 1. could not contain cell groups,
2. does not contain cell groups, or
3. contains potential cell groups.

Likewise, each object in every FOV has been classified as 1. an artifact group,
2. a probable endocervical cell group,
3. a potentially abnormal cell group,
4. a probable metaplastic/parabasal cell group, or
5. an uncertain endocervical/metaplastic/parabasal cell group.

As processing for each FOV is finished, results of all its objects are passed to the 20× FOV integration process. The integration process accumulates results, object by object. When results are finally accumulated for all objects in every FOV, processing for that slide is complete. When each FOV is finished, its results are passed to the thick group process, the 20× FOV integration process, and to system software. System software accumulates a slide's results and conveys them to the scoring processes.

Process performance has been tracked and validated throughout all stages of classification training. A cross validation method was adapted for performance tracking at each stage, in which training data is randomly divided into ten equal sets. A classifier is then trained by nine of the ten sets and tested on the remaining set. Sets are rotated and the process is repeated until every combination of nine sets has been used for testing.

TABLE A.1

Features, by Type (vertical axis), as Measured in Different Areas (horizontal axis) of the Image

| density | 7, 111, 116, 119 | | 48 | 146, 147 |
|---|---|---|---|---|
| size | 5, 103, 104, 125 | | | |
| shape | 6, 99, 106 | | | |
| texture | 8, 13, 14, 15, 18, 20, 21, 25, 27, 28, 29, 30, 31, 121, 136 | 77, 81, 83, 84, 86, 88, 91 | 51, 52, 55, 58, 64 | 151, 152, 153, 154, 157, 158, 160, 161, 162, 165, 166, |

TABLE A.1-continued

Features, by Type (vertical axis), as Measured in Different Areas (horizontal axis) of the Image

| orientation | 9, 42, 101 | 72 | 169, 173, 174 |
|---|---|---|---|
| nuclear/ cytoplasm texture | 2 | | |
| nuclear/ cytoplasm size | 3 | | |
| content | | | 149 |

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A classifier development method comprising the steps of:

a) developing a preliminary classifier for use in an automated, computer controlled, classification system using a set of collected objects;
   b) executing the preliminary classifier and any additional classifiers in the automated, computer controlled, classification system;
   c) evaluating the preliminary classifier and any additional classifiers using interactive data display and visualization methods to develop statistical quantities to characterize data distribution and decision boundaries, wherein said characterization includes the step of determining an error rate of the preliminary classifier and any additional classifiers;
   d) examining features and images of collected objects that the preliminary classifier and any additional classifiers failed to correctly classify so as to determine failure causes;
   e) comparing performance of the preliminary classifier and any additional classifiers with predetermined goals for feature selection to provide evaluation results; and
   f) building an additional classifier if the evaluation results show the current performance level falls short of the desirable goal and repeating steps b)–e) using only objects not previously classified correctly to build the additional classifier.

2. The classifier development method of claim 1 further comprising the steps of further refining the preliminary classifier and any additional classifiers by acquiring additional data and refined features, and then rebuilding the preliminary classifier and any additional classifiers using the additional data and refined features.

3. The method of claim 1 wherein the step of developing a preliminary classifier includes the step of developing a preliminary cytological classifier.

4. The method of claim 1 wherein the step of building an additional classifier includes the step of developing a probable abnormal cell classifier.

5. The method of claim 1 wherein the step of building an additional classifier includes the step of developing an endocervical cell classifier.

6. The method of claim 1 wherein the step of building an additional classifier includes the step of developing an artifact classifier.

7. The method of claim 1 wherein the step of building an additional classifier includes the step of developing a probable endocervical cell group classifier.

8. The method of claim 1 wherein the step of building an additional classifier includes the step of building a probable metaplastic/parabasal group classifier.

9. The method of claim 1 wherein the step of building an additional classifier includes the step of building an uncertain endocervical/metaplastic/parabasal group classifier.

10. The method of claim 1 wherein the step of building an additional classifier includes the step of building a potential abnormal cell group classifier.

11. An object classifier training process for an automated classification system, the object classifier training process comprising the steps of:

a) semi-automatically acquiring images of objects of interest;

b) refining the acquired images by segmentation processing to produce segmented objects;

c) labeling the segmented objects with their true classes to produce labeled objects;

d) using the labeled objects for object classifier training for generating an object classifier;

e) testing the object classifier and, if the performance of the classifier is unsatisfactory, then objects that the object classifier failed to classify correctly are acquired in an automated object acquisition mode; and f) building a subsequent classifier using only the objects that the current object classifier failed to classify correctly and repeating steps a)–f) until the performance of the initial object classifier and subsequent object classifiers are satisfactory.

12. The object classifier training process of claim 11 wherein the step of generating an object classifier comprises the step of generating an endocervical cell classifier.

13. The object classifier training process of claim 11 wherein the step of generating an object classifier comprises the step of generating an artifact classifier.

14. The object classifier training process of claim 11 wherein the step of generating an object classifier comprises the step of generating a probable endocervical cell group classifier.

15. The object classifier training process of claim 11 wherein the step of generating an object classifier comprises the step of generating a probable metaplastic/parabasal group classifier.

16. The object classifier training process of claim 11 wherein the step of generating an object classifier comprises the step of generating an uncertain endocervical/metaplastic/parabasal group classifier.

17. The object classifier training process of claim 11 wherein the step of generating an object classifier comprises the step of generating a potential abnormal cell group.

18. The object classifier training process of claim 11 wherein the step of semi-automatically acquiring images comprises the steps of:

selecting a slide from a training slide set;

qualifying training objects from the slide;

establishing a slide level diagnosis;

acquiring training object coordinates;

acquiring training object images located at the training object coordinates;

segmenting the acquired images; and extracting features corresponding to the segmented objects.

19. A method for development of multi-stage object classifiers for use in an automated classification system, the method comprising the steps of:

using acquired images from an object library to generate an initial classifier;

operating the initial classifier in the automated classification system to identify objects;

conducting an automated data collection process to acquire additional training samples; and using the additional training samples and the acquired images to train a plurality of subsequent classifiers by using newly acquired data wherein the newly acquired data are the samples that the current classifiers failed to classify correctly.

20. The method of claim 19 wherein the acquired images comprise cytological images.

21. The method of claim 1 wherein the step of building an additional classifier includes the step of developing an endometrial cell group classifier.

22. The method of claim 1 wherein the step of building an additional classifier includes the step of developing an intermediate cell classifier.

23. The object classifier training process of claim 11 wherein the step of generating an object classifier comprises the step of generating an endometrial cell group classifier.

24. The object classifier training process of claim 11 wherein the step of generating an object classifier comprises the step of generating an intermediate cell classifier.

* * * * *